(12) United States Patent
Wang et al.

(10) Patent No.: US 10,969,565 B2
(45) Date of Patent: Apr. 6, 2021

(54) PROJECTION LENS ASSEMBLY

(71) Applicant: ZHEJIANG SUNNY OPTICAL CO., LTD., Ningbo (CN)

(72) Inventors: Xinquan Wang, Ningbo (CN); Yuanlin Jia, Ningbo (CN); Lin Huang, Ningbo (CN)

(73) Assignee: ZHEJIANG SUNNY OPTICAL CO., LTD.

( * ) Notice: Subject to any disclaimer, the term of this patent is extended or adjusted under 35 U.S.C. 154(b) by 248 days.

(21) Appl. No.: 16/273,855

(22) Filed: Feb. 12, 2019

(65) Prior Publication Data

US 2019/0187415 A1     Jun. 20, 2019

Related U.S. Application Data

(63) Continuation of application No. PCT/CN2018/092207, filed on Jun. 21, 2018.

(30) Foreign Application Priority Data

Dec. 15, 2017 (CN) .......................... 201711348942.9
Dec. 15, 2017 (CN) .......................... 201721754652.X

(51) Int. Cl.
*G02B 13/00* (2006.01)
*G02B 9/34* (2006.01)

(52) U.S. Cl.
CPC ............. *G02B 13/004* (2013.01); *G02B 9/34* (2013.01)

(58) Field of Classification Search
CPC ............ G02B 13/004; G02B 9/34; G02B 9/36
See application file for complete search history.

(56) References Cited

U.S. PATENT DOCUMENTS 5,969,883 A    10/1999  Yamakawa et al.
2019/0137733 A1*  5/2019  Gong .................... G01B 11/25

FOREIGN PATENT DOCUMENTS

CN    102368112 A    3/2012
JP    2011081072 A   4/2011

* cited by examiner

*Primary Examiner* — Wen Huang
(74) *Attorney, Agent, or Firm* — Barnes & Thornburg LLP

(57) ABSTRACT

A projection lens assembly is provided. The projection lens assembly includes, sequentially along an optical axis from a source-side to an image side, a first lens having a positive refractive power; a second lens having a negative refractive power, where a source-side surface and an image-side surface of the second lens are concave surfaces; a third lens having a positive refractive power or a negative refractive power; and a fourth lens having a positive refractive power, where an image-side surface of the fourth lens is a convex surface. A total effective focal length f of the projection lens assembly and an effective focal length f1 of the first lens satisfy: $2.0<f/f1<3.5$.

20 Claims, 9 Drawing Sheets

PROJECTION LENS ASSEMBLY

CROSS-REFERENCE TO RELATED APPLICATIONS

This application is a continuation of International Application No. PCT/CN2018/092207, filed on Jun. 21, 2018, which claims the priorities and rights to Chinese Patent Application No. 201711348942.9 and Chinese Patent Application No. 201721754652.X filed with the China National Intellectual Property Administration (CNIPA) on Dec. 15, 2017. All of the aforementioned applications are hereby incorporated by reference in their entireties.

TECHNICAL FIELD

The present disclosure relates to a projection lens assembly, and more specifically to a projection lens assembly including four lenses.

BACKGROUND

In recent years, with the continuous improvement of the science and technology and the stepwise rise of interactive devices, the application range of projection lens assembly has become more and more wide. Nowadays, due to the quick development of the chip technology and the quick development of the intelligent algorithm, a three-dimensional image having the position depth information of an object may be calculated by using an optical projection lens assembly to project an image to a space object and receive a signal of the image. Specifically, the three-dimensional image containing the position depth information of the projected object may be calculated by: projecting light emitted by an infrared laser diode (LD) or a vertical-cavity surface-emitting laser (VCSEL) to a target object using the optical projection lens assembly; re-distributing a projected image on the target object by making a projecting beam pass through a defractive optical element (DOE); and receiving the image projected onto the object using a camera lens assembly. Further, the three-dimensional image having the depth information may be used in the development of various deep applications such as the biometric identification.

In general, in the conventional projection lens assembly, various aberrations are eliminated and resolution is enhanced by increasing the number of lenses. However, the increase of the number of the lenses may cause the increase of the total track length of the projection lens assembly, which is not conductive to the miniaturization of the lens assembly. In addition, the general projection lens assembly having a large field-of-view also has many problems such as large amount of distortion and poor imaging quality, and cannot match the defractive optical element (DOE) to accurately realize the redistribution of the projected beam on the target object.

SUMMARY

The present disclosure provides a projection lens assembly which may be applicable to portable electronic products and may at least or partially solve at least one of the above disadvantages in the existing technology.

According to an aspect, the present disclosure provides a projection lens assembly. The projection lens assembly may include, sequentially along an optical axis from a source-side to an image side, a first lens having a positive refractive power; a second lens having a negative refractive power, where a source-side surface and an image-side surface of the second lens may both be concave surfaces; a third lens having a positive refractive power or a negative refractive power; and a fourth lens having a positive refractive power, where an image-side surface of the fourth lens may be a convex surface. A total effective focal length f of the projection lens assembly and an effective focal length f1 of the first lens may satisfy: $2.0 < f/f1 < 3.5$.

In an implementation, a center thickness CT4 of the fourth lens on the optical axis and a center thickness CT2 of the second lens on the optical axis may satisfy: $1.5 < CT4/CT2 < 3.0$.

In an implementation, a spacing distance T12 on the optical axis between the first lens and the second lens and a spacing distance T23 on the optical axis between the second lens and the third lens may satisfy: $0.8 < T12/T23 < 2.2$.

In an implementation, a radius R8 of curvature of the image-side surface of the fourth lens and a radius R1 of curvature of a source-side surface of the first lens may satisfy: $-1.5 \leq R8/R1 \leq -1.0$.

In an implementation, a radius R4 of curvature of the image-side surface of the second lens and a radius R3 of curvature of the source-side surface of the second lens may satisfy: $-2.4 < R4/R3 < -0.8$.

In an implementation, the total effective focal length f of the projection lens assembly and an effective focal length f2 of the second lens may satisfy: $f/f2 \leq -4.0$. Further, the total effective focal length f of the projection lens assembly and the effective focal length f2 of the second lens may satisfy: $-10.0 \leq f/f2 \leq -4.0$.

In an implementation, the total effective focal length f of the projection lens assembly and an effective focal length f4 of the fourth lens may satisfy: $1.5 < f/f4 < 2.5$.

In an implementation, the third lens may have a positive refractive power.

In an implementation, an effective focal length f3 of the third lens and the total effective focal length f of the projection lens assembly may satisfy: $1.0 < f3/f < 5.5$.

In an implementation, a maximum effective semi-diameter DT42 of the image-side surface of the fourth lens and a maximum effective semi-diameter DT41 of a source-side surface of the fourth lens may satisfy: $1.0 < DT42/DT41 < 1.4$.

In an implementation, a light transmittance of the projection lens assembly may be greater than 85% in a light wave range from 800 nm to 1000 nm.

In an implementation, a distance TTL on the optical axis from a source plane of the projection lens assembly to the image-side surface of the fourth lens and the total effective focal length f of the projection lens assembly may satisfy: $TTL/f < 1.0$.

According to another aspect, the present disclosure provides a projection lens assembly. The projection lens assembly may include, sequentially along an optical axis from a source-side to an image side, a first lens having a positive refractive power; a second lens having a negative refractive power, where a source-side surface and an image-side surface of the second lens may both be concave surfaces; a third lens having a positive refractive power or a negative refractive power; and a fourth lens having a positive refractive power, where an image-side surface of the fourth lens may be a convex surface. A total effective focal length f of the projection lens assembly and an effective focal length f4 of the fourth lens may satisfy: $1.5 < f/f4 < 2.5$.

According to another aspect, the present disclosure further provides a projection lens assembly. The projection lens assembly may include, sequentially along an optical axis from a source-side to an image side, a first lens having a positive refractive power; a second lens having a negative refractive power, where a source-side surface and an image-side surface of the second lens may both be concave surfaces; a third lens having a positive refractive power or a negative refractive power; and a fourth lens having a positive refractive power, where an image-side surface of the fourth lens may be a convex surface. A total effective focal length f of the projection lens assembly and an effective focal length f2 of the second lens may satisfy: $f/f2 \leq -4.0$.

According to another aspect, the present disclosure further provides a projection lens assembly. The projection lens assembly may include, sequentially along an optical axis from a source-side to an image side, a first lens having a positive refractive power; a second lens having a negative refractive power, where a source-side surface and an image-side surface of the second lens may both be concave surfaces; a third lens having a positive refractive power; and a fourth lens having a positive refractive power, where an image-side surface of the fourth lens may be a convex surface. An effective focal length f3 of the third lens and a total effective focal length f of the projection lens assembly may satisfy: $1.0<f3/f<5.5$.

According to another aspect, the present disclosure further provides a projection lens assembly. The projection lens assembly may include, sequentially along an optical axis from a source-side to an image side, a first lens having a positive refractive power; a second lens having a negative refractive power, where a source-side surface and an image-side surface of the second lens may both be concave surfaces; a third lens having a positive refractive power or a negative refractive power; and a fourth lens having a positive refractive power, where an image-side surface of the fourth lens may be a convex surface. A radius R8 of curvature of the image-side surface of the fourth lens and a radius R1 of curvature of a source-side surface of the first lens may satisfy: $-1.5 \leq R8/R1 \leq -1.0$.

According to another aspect, the present disclosure further provides a projection lens assembly. The projection lens assembly may include, sequentially along an optical axis from a source-side to an image side, a first lens having a positive refractive power; a second lens having a negative refractive power, where a source-side surface and an image-side surface of the second lens may both be concave surfaces; a third lens having a positive refractive power or a negative refractive power; and a fourth lens having a positive refractive power, where an image-side surface of the fourth lens may be a convex surface. A radius R4 of curvature of the image-side surface of the second lens and a radius R3 of curvature of the source-side surface of the second lens may satisfy: $-2.4<R4/R3<-0.8$.

According to another aspect, the present disclosure further provides a projection lens assembly. The projection lens assembly may include, sequentially along an optical axis from a source-side to an image side, a first lens having a positive refractive power; a second lens having a negative refractive power, where a source-side surface and an image-side surface of the second lens may both be concave surfaces; a third lens having a positive refractive power or a negative refractive power; and a fourth lens having a positive refractive power, where an image-side surface of the fourth lens may be a convex surface. A spacing distance T12 on the optical axis between the first lens and the second lens and a spacing distance T23 on the optical axis between the second lens and the third lens may satisfy: $0.8<T12/T23<2.2$.

According to another aspect, the present disclosure further provides a projection lens assembly. The projection lens assembly may include, sequentially along an optical axis from a source-side to an image side, a first lens having a positive refractive power; a second lens having a negative refractive power, where a source-side surface and an image-side surface of the second lens may both be concave surfaces; a third lens having a positive refractive power or a negative refractive power; and a fourth lens having a positive refractive power, where an image-side surface of the fourth lens may be a convex surface. A maximum effective semi-diameter DT42 of the image-side surface of the fourth lens and a maximum effective semi-diameter DT41 of a source-side surface of the fourth lens may satisfy: $1.0<DT42/DT41<1.4$.

The present disclosure adopts a plurality of lenses (e.g., four lenses). By reasonably setting the refractive powers and the surface types of the lenses, the center thicknesses of the lenses, the spacing distances on the optical axis between the lenses, etc., the projection lens assembly has at least one of the beneficial effects such as large aperture, miniaturization, and high imaging quality.

BRIEF DESCRIPTION OF THE DRAWINGS

By describing non-limiting embodiments below in detail and in combination with the accompanying drawings, other features, objectives and advantages of the present disclosure will be more apparent. In the accompanying drawings.

DETAILED DESCRIPTION

Figure 1:
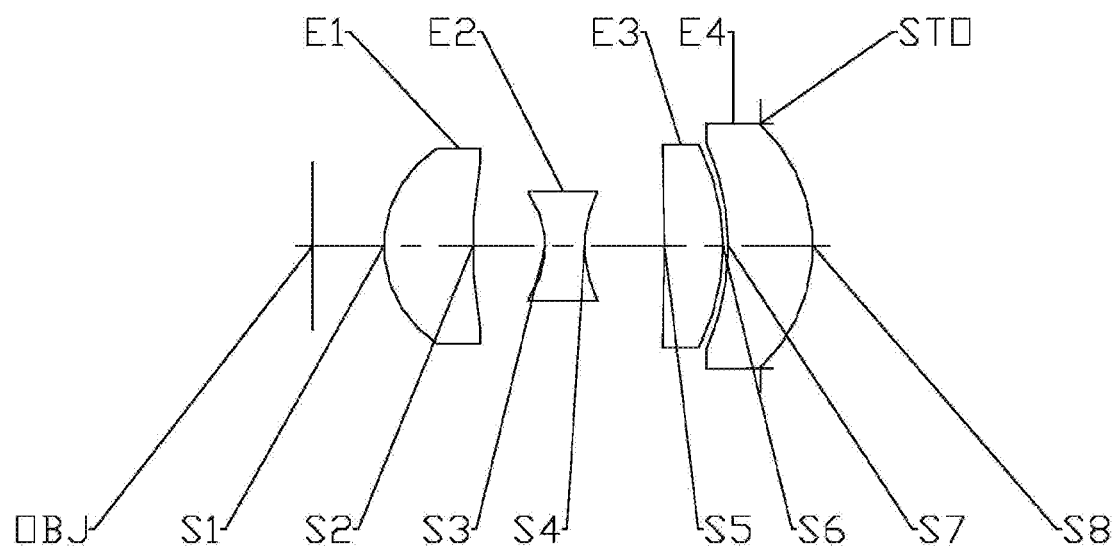
FIG. 1 is a schematic structural diagram illustrating a projection lens assembly according to a first embodiment of the present disclosure.

For better understanding the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions such as "first" and "second" are only used to distinguish one feature from another, rather than represent any limitations to the features. Thus, without departing from the teachings of the present disclosure, the first lens discussed below may also be referred to as the second lens, and the second lens may also be referred to as the first lens.

In the accompanying drawings, the thicknesses, sizes and shapes of the lenses are slightly exaggerated for the convenience of description. Specifically, shapes of spherical surfaces or aspheric surfaces shown in the accompanying drawings are examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens has a convex surface and a position of the convex surface is not defined, at least the portion of the surface of the lens in the paraxial area is the convex surface; and if the surface of the lens has a concave surface and a position of the concave surface is not defined, at least the portion of the surface of the lens in the paraxial area is the concave surface. The surface closest to the source-side in each lens is referred to as the source-side surface, and the surface closest to the image side in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The projection lens assembly according to exemplary implementations of the present disclosure may include, for example, four lenses (i.e., a first lens, a second lens, a third lens, and a fourth lens) having refractive powers. The four lenses are arranged in sequence along an optical axis from a source-side to an image-side.

In the exemplary implementations, the first lens may have a positive refractive power. The second lens may have a negative refractive power, a source-side surface of the second lens may be a concave surface, and an image-side surface of the second lens may be a concave surface. The third lens may have a positive refractive power or a negative refractive power. The fourth lens may have a positive refractive power, and an image-side surface of the fourth lens may be a convex surface. The first lens having the positive refractive power is conductive to achieving telecentricity at the source-side of the projection system, enhancing the amount of light entering the off-axis field of view of the projection system, and increasing the resolution, the intensity and the uniformity of a projected image. The second lens has the negative refractive power, the source-side surface of the second lens is the concave surface, and the image-side surface of the second lens is the concave surface, which help the principal plane at the source-side to be far away from the image source, to shorten the total track length TTL of the projection system, thereby achieving the miniaturization of the lens assembly. The third lens having a refractive power may effectively adjust the incident angle of light entering the off-axis field of view, to correct the aberration of the off-axis field of view. The fourth lens having the positive refractive power is conductive to shortening the total track length TTL of the projection system. When the image-side surface of the fourth lens is the convex surface, it is conductive to reducing the spherical aberration of the projection system and improving the imaging quality of the projection system.

In the exemplary implementations, a source-side surface of the first lens may be a convex surface.

In the exemplary implementations, the third lens may have a positive refractive power, a source-side surface of the third lens may be a concave surface, and an image-side surface of the third lens may be a convex surface.

In the exemplary implementations, a source-side surface of the fourth lens may be a concave surface.

In the exemplary implementations, the projection lens assembly of the present disclosure may satisfy the conditional expression f/f2≤−4.0. In the conditional expression, f is the total effective focal length of the projection lens assembly, and f2 is the effective focal length of the second lens. More specifically, f and f2 may further satisfy: −10.0≤f/f2≤−4.0, for example, −9.80≤f/f2≤−5.41. Satisfying the conditional expression f/f2≤−4.0 is conductive to achieving a better balance between the improvement of the imaging quality of the projection system and the miniaturization of the projection system.

In the exemplary implementations, the projection lens assembly of the present disclosure may satisfy the conditional expression 2.0<f/f1<3.5. In the conditional expression, f is the total effective focal length of the projection lens assembly, and f1 is the effective focal length of the first lens. More specifically, f and f1 may further satisfy: 2.30<f/f1<3.40, for example, 2.41≤f/f1≤3.33. Satisfying the conditional expression 2.0<f/f1<3.5 is conductive to achieving the telecentricity at the source-side of the projection system, thereby shortening the total track length TTL of the projection system, and is thus conductive to achieving a good balance between the reduction of the total track length TTL of the projection system and the improvement of the imaging quality of the projection system.

In the exemplary implementations, a light transmittance of the projection lens assembly of the present disclosure is greater than 85% in a light wave band from about 800 nm to about 1000 nm. Such a setting is conductive to improving the transmittance of the light near-infrared light transmitting through the projection lens assembly, to obtain a higher-intensity near-infrared projected image.

In the exemplary implementations, the projection lens assembly of the present disclosure may satisfy the conditional expression 1.0<f3/f<5.5. In the conditional expression, f3 is the effective focal length of the third lens, and f is the total effective focal length of the projection lens assembly. More specifically, f3 and f may further satisfy: 1.32≤f3/f≤5.39. Satisfying the conditional expression 1.0<f3/f<5.5 is conductive to adjusting the distribution of the refractive power, to avoid the increase of the tolerance sensitivity of the projection system caused by the excessive concentration of the refractive power. In addition, when one of the second lens and the fourth lens or both of them are glass lenses, satisfying the conditional expression 1.0<f3/f<5.5 is conductive to maintaining the stability of the image plane when the temperature changes, which is conductive to improving of the temperature characteristic of the projection system.

In the exemplary implementations, the projection lens assembly of the present disclosure may satisfy the conditional expression −1.5≤R8/R1≤−1.0. In the conditional expression, R8 is the radius of curvature of the image-side surface of the fourth lens, and R1 is the radius of curvature of the source-side surface of the first lens. More specifically, R8 and R1 may further satisfy: −1.35≤R8/R1≤−1.00. Satisfying the conditional expression −1.5≤R8/R1≤−1.0 is conductive to eliminating the distortion and aberration of the projection system.

In the exemplary implementations, the projection lens assembly of the present disclosure may satisfy the conditional expression 1.5<f/f4<2.5. In the conditional expression, f is the total effective focal length of the projection lens assembly and f4 is the effective focal length of the fourth lens. More specifically, f and f4 may further satisfy: 1.63≤f/f4≤2.39. Satisfying the conditional expression 1.5<f/f4<2.5 is conductive to reducing the tolerance sensitivity of the fourth lens. In addition, when the fourth lens is a glass lens, Satisfying the conditional expression 1.5<f/f4<2.5 is also conductive to reducing the temperature sensitivity of the projection system, to ensure a high projection quality over a wide temperature range.

In the exemplary implementations, the projection lens assembly of the present disclosure may satisfy the conditional expression −2.4<R4/R3<−0.8. In the conditional expression, R4 is the radius of curvature of the image-side surface of the second lens, and R3 is the radius of curvature of the source-side of the second lens. More specifically, R4 and R3 may further satisfy: −2.25<R4/R3<−0.85, for example, −2.19≤R4/R3≤−0.96. Satisfying the conditional expression −2.4<R4/R3<−0.8 is conductive to reducing the incident angle and emergent angle of each field of view at the second lens, to reduce the tolerance sensitivity of the second lens, thereby improving the production yield of the projection lens assembly.

In the exemplary implementations, the projection lens assembly may satisfy the conditional expression 0.8<T12/T23<2.2. In the conditional expression, T12 is the spacing distance on the optical axis between the first lens and the second lens, and T23 is the spacing distance on the optical axis between the second lens and the third lens. More specifically, T12 and T23 may further satisfy: 0.88≤T12/T23≤2.11. Satisfying the conditional expression 0.8<T12/T23<2.2 is conductive to reasonably distributing the spacing distances between the lenses, and adjusting the optical path distribution, thereby reducing the tolerance sensitivity of the projection system, and being conductive to the assembly of the lens assembly and the improvement of the production yield of the projection system.

In the exemplary implementations, the projection lens assembly of the present disclosure may satisfy the conditional expression 1.5<CT4/CT2<3.0. In the conditional expression, CT4 is the center thickness of the fourth lens on the optical axis, and CT2 is the center thickness of the second lens on the optical axis. More specifically, CT4 and CT2 may further satisfy: 1.59≤CT4/CT2≤2.82. Satisfying the conditional expression 1.5<CT4/CT2<3.0 is conductive to achieving a good balance between the reduction of the total track length TTL of the projection system and the improvement of the manufacturing technology of the second lens and the fourth lens.

In the exemplary implementations, the projection lens assembly of the present disclosure may satisfy the conditional expression 1.0<DT42/DT41<1.4. In the conditional expression, DT42 is the maximum effective semi-diameter of the image-side surface of the fourth lens, and DT41 is the maximum effective semi-diameter of the source-side surface of the fourth lens. More specifically, DT42 and DT41 may further satisfy: 1.05<DT42/DT41<1.25, for example, 1.13≤DT42/DT41≤1.19. Satisfying the conditional expression 1.0<DT42/DT41<1.4 is conductive to shortening the total track length TTL of the projection system, to achieve the miniaturization; and conductive to well balancing the tolerance sensitivity of the projection system.

In the exemplary implementations, the projection lens assembly of the present disclosure may satisfy the conditional expression TTL/f<1.0. In the conditional expression, TTL is the axial distance from an image-source plane of the projection lens assembly to the image-side surface of the fourth lens, and f is the total effective focal length of the projection lens assembly. More specifically, TTL and f may further satisfy: 0.60<TTL/f<0.90, for example, 0.67≤TTL/f≤0.82. Reasonably controlling the ratio of TTL to f is conductive to maintaining the miniaturization of the projection lens assembly.

In the exemplary implementations, the above projection lens assembly may further include at least one diaphragm, to improve the imaging quality of the lens assembly. For example, the diaphragm may be disposed between the fourth lens and the image side as needed.

Alternatively, the above projection lens assembly may further include other well-known optical projection elements such as prisms and field lenses. Alternatively, the above projection lens assembly can be used in conjunction with a diffractive optical element (DOE).

The projection lens assembly according to the above implementations of the present disclosure may use, for example, four lenses. By reasonably setting the refractive powers and the surface types of the lenses, the center thicknesses of the lenses, the axial spacing distances between the lenses, etc., the projection lens assembly has beneficial effects such as large aperture, miniaturization, and high imaging quality.

In the implementations of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the projection lens assembly without departing from the technical solution claimed by the present disclosure. For example, although the projection lens assembly having four lenses is described as an example in the implementations, the projection lens assembly is not limited to include four lenses. If desired, the projection lens assembly may alternatively include other numbers of lenses.

Specific embodiments of the projection lens assembly that may be applied to the above implementations are further described below with reference to the accompanying drawings.

First Embodiment

A projection lens assembly according to a first embodiment of the present disclosure is described below with reference to FIGS. 1-2. FIG. 1 is a schematic structural diagram illustrating the projection lens assembly according to the first embodiment of the present disclosure.

As shown in FIG. 1, the projection lens assembly according to the exemplary implementations of the present disclosure includes, sequentially along an optical axis from a source-side to an image side, a first lens E1, a second lens E2, a third lens E3, a fourth lens E4, and a diaphragm STO.

The first lens E1 has a positive refractive power, a source-side surface S1 of the first lens E1 is a convex surface, and an image-side surface S2 of the first lens E1 is a concave surface. The second lens E2 has a negative refractive power, a source-side surface S3 of the second lens E2 is a concave surface, and an image-side surface S4 of the second lens E2 is a concave surface. The third lens E3 has a positive refractive power, a source-side surface S5 of the third lens E3 is a concave surface, and an image-side surface S6 of the third lens E3 is a convex surface. The fourth lens E4 has a positive refractive power, a source-side surface S7 of the fourth lens E4 is a concave surface, and an image-side surface S8 of the fourth lens E4 is a convex surface. A light transmittance of the projection lens assembly is greater than 85% in a light wave range from about 800 nm to about 1000 nm. Light from an image source sequentially passes through the surfaces S1-S8 and finally forms an image on, for example, the projection plane of a projection screen (not shown).

Table 1 shows the surface type, the radius of curvature, the thickness, the material and the conic coefficient of each lens of the projection lens assembly in the first embodiment. The units of the radius of curvature and the thickness are both millimeters (mm).

TABLE 1

| surface number | surface type | radius of curvature | thickness | refractive index | abbe number | conic coefficient |
|---|---|---|---|---|---|---|
| OBJ | spherical | infinite | 0.4700 | | | |
| S1 | aspheric | 0.7924 | 0.5878 | 1.63 | 20.4 | −0.2975 |
| S2 | aspheric | 4.0668 | 0.4773 | | | 0.0000 |
| S3 | aspheric | −0.7131 | 0.2600 | 1.63 | 20.4 | 0.0000 |
| S4 | aspheric | 0.8912 | 0.5270 | | | −15.3262 |
| S5 | aspheric | −3.6367 | 0.3856 | 1.53 | 56.2 | −60.0000 |
| S6 | aspheric | −1.7447 | 0.0350 | | | 4.5927 |
| S7 | aspheric | −2.1148 | 0.5573 | 1.76 | 49.6 | 3.7862 |
| S8 | aspheric | −1.0671 | −0.3465 | | | −0.3875 |
| STO | spherical | infinite | infinite | | | |
| IMA | spherical | infinite | | | | |

As may be obtained from Table 1, the source-side surface and the image-side surface of each lens in the first to fourth lenses E1-E4 are both aspheric surfaces. In this embodiment, the surface type x of each aspheric surface may be defined using, but not limited to, the following formula:

$$x = \frac{ch^2}{1 + \sqrt{1-(k+1)c^2h^2}} + \sum Aih^i. \tag{1}$$

Here, x is the sag to the aspheric vertex, when the aspheric surface is at height h from the optical axis; c is the paraxial curvature of the aspheric surface, and c=1/R (i.e., the paraxial curvature c is the reciprocal of the radius R of curvature in Table 1 above); k is the conic coefficient (given in Table 1); and Ai is the correction coefficient of the $i^{th}$ order of the aspheric surface. Table 2 below shows the high-order coefficients $A_4$, $A_6$, $A_8$, $A_{10}$, $A_{12}$, $A_{14}$, and $A_{16}$ applicable to the aspheric surfaces S1-S8 in the first embodiment.

TABLE 2

| surface number | A4 | A6 | A8 | A10 | A12 | A14 | A16 |
|---|---|---|---|---|---|---|---|
| S1 | 4.8050E−01 | −8.3005E−01 | 1.7007E+00 | 1.3699E+00 | −7.8838E+00 | 0.0000E+00 | 0.0000E+00 |
| S2 | 4.1027E−01 | 1.4452E+00 | −1.8285E+01 | 1.4913E+02 | −9.1189E+02 | 2.4319E+03 | −2.2519E+03 |
| S3 | −1.0845E+00 | 1.5981E+00 | −1.6735E+02 | 2.9643E+03 | −3.4588E+04 | 1.5639E+05 | −2.8757E+04 |
| S4 | 2.9957E+00 | −1.8077E+01 | 2.2344E+02 | −2.8640E+03 | 2.8388E+04 | −1.6852E+05 | 4.3326E+05 |
| S5 | −2.0589E−01 | 2.8100E−01 | 1.0381E+01 | −7.6181E+01 | 2.8153E+02 | −4.9059E+02 | 3.2576E+02 |
| S6 | 1.7615E−01 | −5.6099E+00 | 5.5872E+01 | −2.8463E+02 | 7.7772E+02 | −1.0827E+03 | 6.2231E+02 |
| S7 | 1.6034E−01 | −3.6484E+00 | 3.2761E+01 | −1.5811E+02 | 4.0391E+02 | −5.2148E+02 | 2.6922E+02 |
| S8 | −2.1000E−04 | −7.8510E−02 | 2.2691E−01 | −2.5163E−01 | −8.7662E−01 | 2.1970E+00 | −1.4572E+00 |

Table 3 shows the total effective focal length f of the projection lens assembly in the first embodiment, and the effective focal lengths f1-f4 of the lenses.

TABLE 3

| parameter | f (mm) | f1 (mm) | f2 (mm) | f3 (mm) | f4 (mm) |
|---|---|---|---|---|---|
| numerical value | 4.50 | 1.45 | −0.59 | 5.96 | 2.31 |

The projection lens assembly in the first embodiment satisfies:

f/f2=−7.63, wherein f is the total effective focal length of the projection lens assembly, and f2 is the effective focal length of the second lens E2;

f/f1=3.10, wherein f is the total effective focal length of the projection lens assembly, and f1 is the effective focal length of the first lens E1;

f3/f=1.32, wherein f3 is the effective focal length of the third lens E3, and f is the total effective focal length of the projection lens assembly;

R8/R1=−1.35, wherein R8 is the radius of curvature of the image-side surface S8 of the fourth lens E4, and R1 is the radius of curvature of the source-side surface S1 of the first lens E1;

f/f4=1.95, wherein f is the total effective focal length of the projection lens assembly, and f4 is the effective focal length of the fourth lens E4;

R4/R3=−1.25, wherein R4 is the radius of curvature of the image-side surface S4 of the second lens E2, and R3 is the radius of curvature of the source-side surface S3 of the second lens E2;

T12/T23=0.91, wherein T12 is the spacing distance on the optical axis between the first lens E1 and the second lens E2, and T23 is the spacing distance on the optical axis between the second lens E2 and the third lens E3;

CT4/CT2=2.14, wherein CT4 is the center thickness of the fourth lens E4 on the optical axis, and CT2 is the center thickness of the second lens E2 on the optical axis;

DT42/DT41=1.19, wherein DT42 is the maximum effective semi-diameter of the image-side surface S8 of the fourth lens E4, and DT41 is the maximum effective semi-diameter of the source-side surface S7 of the fourth lens E4; and TTL/f=0.73, wherein TTL is the axial distance from the source plane OBJ to the image-side surface S8 of the fourth lens E4, and f is the total effective focal length of the projection lens assembly.

Figure 2:
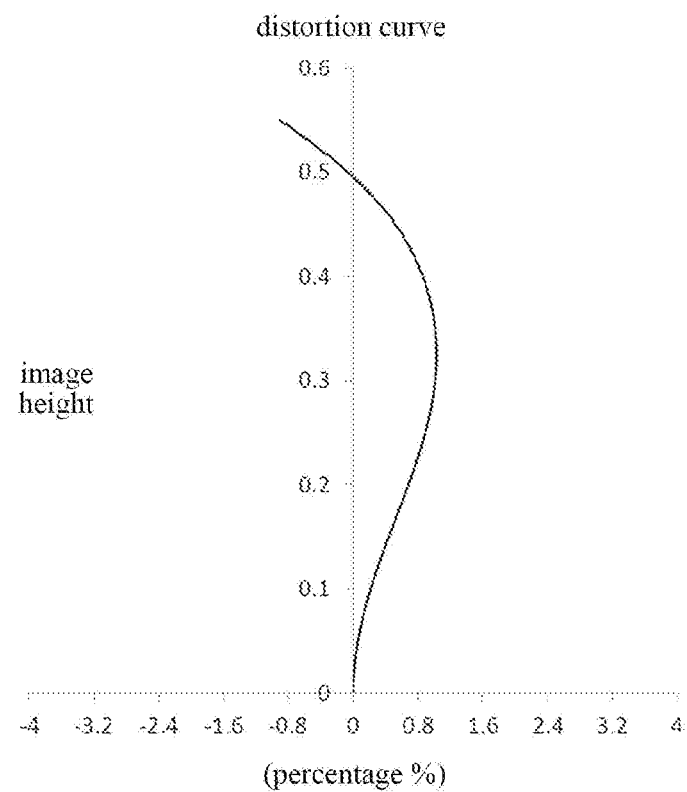
FIG. 2 illustrates a distortion curve of the projection lens assembly according to the first embodiment.

FIG. 2 illustrates the distortion curve of the projection lens assembly according to the first embodiment, representing amounts of distortion at different viewing angles. It can be seen from FIG. 2 that the projection lens assembly according to the first embodiment can achieve a good imaging quality.

Second Embodiment

Figure 3:
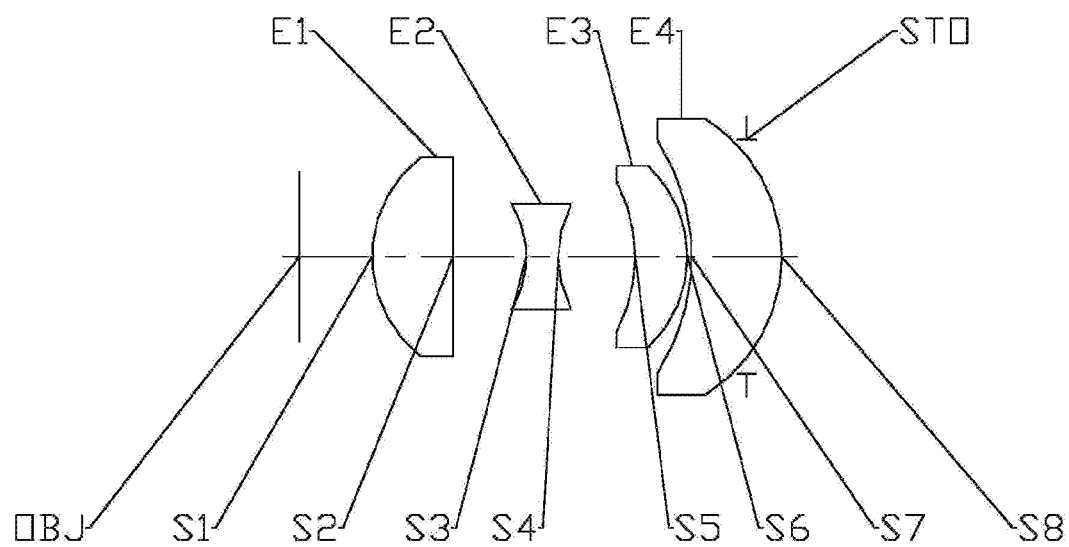
FIG. 3 is a schematic structural diagram illustrating a projection lens assembly according to a second embodiment of the present disclosure.

A projection lens assembly according to a second embodiment of the present disclosure is described below with reference to FIGS. 3-4. In this embodiment and the following embodiments, for the purpose of brevity, the description of parts similar to those in the first embodiment will be omitted. FIG. 3 is a schematic structural diagram illustrating the projection lens assembly according to the second embodiment of the present disclosure.

As shown in FIG. 3, the projection lens assembly according to the exemplary implementations of the present disclosure includes, sequentially along an optical axis from a source-side to an image side, a first lens E1, a second lens E2, a third lens E3, a fourth lens E4, and a diaphragm STO.

The first lens E1 has a positive refractive power, a source-side surface S1 of the first lens E1 is a convex surface, and an image-side surface S2 of the first lens E1 is a concave surface. The second lens E2 has a negative refractive power, a source-side surface S3 of the second lens E2 is a concave surface, and an image-side surface S4 of the second lens E2 is a concave surface. The third lens E3 has a positive refractive power, source-side surface S5 of the third lens E3 is a concave surface, and an image-side surface S6 of the third lens E3 is a convex surface. The fourth lens E4 has a positive refractive power, a source-side surface S7 of the fourth lens E4 is a concave surface, and an image-side surface S8 of the fourth lens E4 is a convex surface. A light transmittance of the projection lens assembly is greater than 85% in a light wave range from about 800 nm to about 1000 nm. Light from an image source sequentially passes through the surfaces S1-S8 and finally forms an image on, for example, the projection plane of a projection screen (not shown).

Table 4 shows the surface type, the radius of curvature, the thickness, the material and the conic coefficient of each lens of the projection lens assembly in the second embodiment. The units of the radius of curvature and the thickness are both millimeters (mm).

TABLE 4

| surface number | surface type | radius of curvature | thickness | refractive index | abbe number | conic coefficient |
|---|---|---|---|---|---|---|
| OBJ | spherical | infinite | 0.5000 | | | |
| S1 | aspheric | 0.8636 | 0.5569 | 1.63 | 20.4 | −0.7619 |
| S2 | aspheric | 7.4739 | 0.5059 | | | 32.9459 |
| S3 | aspheric | −0.8767 | 0.2200 | 1.63 | 20.4 | 2.2313 |
| S4 | aspheric | 0.9064 | 0.5288 | | | 3.1660 |
| S5 | aspheric | −0.9557 | 0.3593 | 1.53 | 55.9 | −1.4757 |
| S6 | aspheric | −0.8464 | 0.0300 | | | −0.2478 |
| S7 | aspheric | −1.8220 | 0.6193 | 1.75 | 49.3 | 3.5218 |
| S8 | aspheric | −1.1131 | −0.2412 | | | 0.1311 |
| STO | spherical | infinite | infinite | | | |
| IMA | spherical | infinite | | | | |

As may be obtained from Table 4, in the second embodiment, the source-side surface and the image-side surface of each lens in the first to fourth lenses E1-E4 are both aspheric surfaces. Table 5 shows the high-order coefficients applicable to each aspheric surface in the second embodiment. The surface type of each aspheric surface may be defined by the formula (1) given in the first embodiment.

TABLE 5

| surface number | A4 | A6 | A8 | A10 | A12 | A14 | A16 |
|---|---|---|---|---|---|---|---|
| S1 | 8.0505E−01 | −4.6397E+00 | 2.2410E+01 | −5.7501E+01 | 6.0022E+01 | 1.3993E+01 | −5.6479E+01 |
| S2 | 4.0667E−01 | −5.2418E+00 | 4.3291E+01 | −2.4489E+02 | 7.6653E+02 | −1.2375E+03 | 8.0725E+02 |

TABLE 5-continued

| surface number | A4 | A6 | A8 | A10 | A12 | A14 | A16 |
|---|---|---|---|---|---|---|---|
| S3 | −6.2410E−02 | −3.5615E+01 | 8.5155E+02 | −1.2697E+04 | 1.0081E+05 | −3.6719E+05 | 4.9109E+05 |
| S4 | 5.6913E−01 | −2.4765E+01 | 9.0322E+02 | −1.9548E+04 | 2.3017E+05 | −1.3869E+06 | 3.4008E+06 |
| S5 | −1.1151E−01 | 3.6489E+00 | −6.7726E+01 | 6.7578E+02 | −3.5458E+03 | 9.2598E+03 | −9.2559E+03 |
| S6 | −1.3269E−01 | 5.7543E+00 | −7.3179E+01 | 4.1421E+02 | −1.1769E+03 | 1.5811E+03 | −7.5435E+02 |
| S7 | −2.3580E−02 | 2.2522E+00 | −2.7978E+01 | 1.4827E+02 | −3.9351E+02 | 5.0908E+02 | −2.5340E+02 |
| S8 | 1.3259E−02 | −1.8760E−01 | 1.5473E+00 | −6.4581E+00 | 1.4063E+01 | −1.5225E+01 | 6.4491E+00 |

Table 6 shows the total effective focal length f of the projection lens assembly in the second embodiment, and the effective focal lengths f1-f4 of the lenses.

TABLE 6

| parameter | f (mm) | f1 (mm) | f2 (mm) | f3 (mm) | f4 (mm) |
|---|---|---|---|---|---|
| numerical value | 4.50 | 1.50 | −0.67 | 6.59 | 2.76 |

Figure 4:
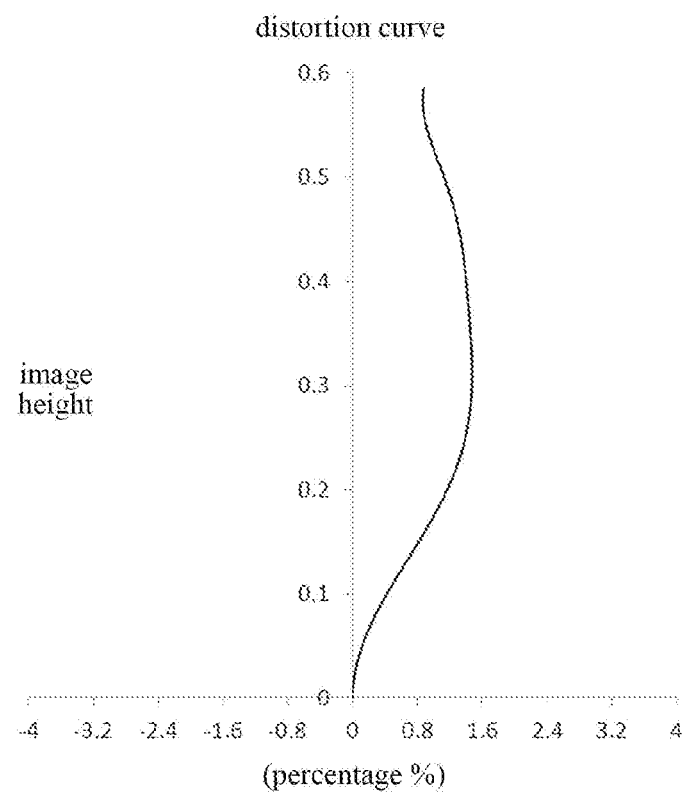
FIG. 4 illustrates a distortion curve of the projection lens assembly according to the second embodiment.

FIG. 4 illustrates the distortion curve of the projection lens assembly according to the second embodiment, representing amounts of distortion at different viewing angles. It can be seen from FIG. 4 that the projection lens assembly according to the second embodiment can achieve a good imaging quality.

Third Embodiment

Figure 5:
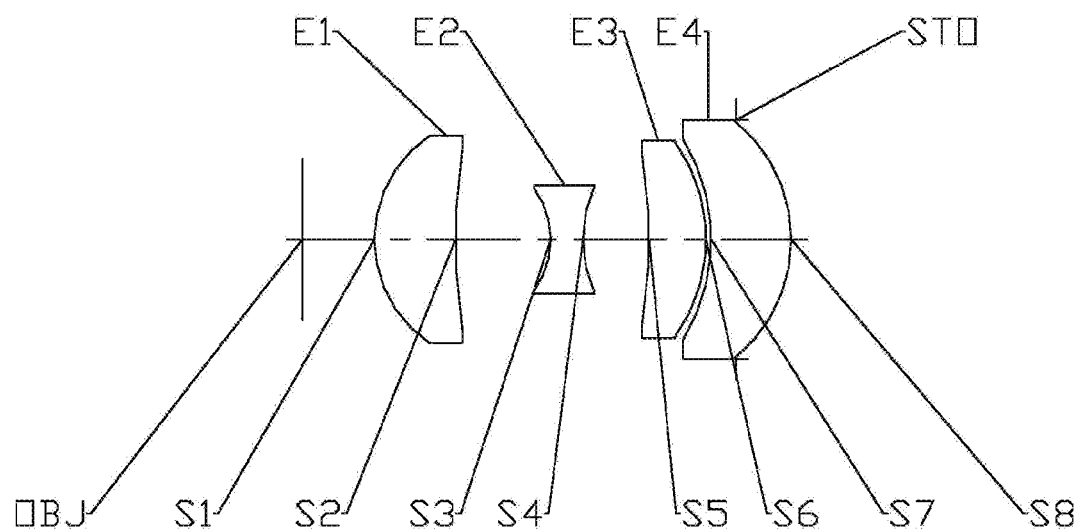
FIG. 5 is a schematic structural diagram illustrating a projection lens assembly according to a third embodiment of the present disclosure.

A projection lens assembly according to a third embodiment of the present disclosure is described below with reference to FIGS. 5-6. FIG. 5 is a schematic structural diagram illustrating the projection lens assembly according to the third embodiment of the present disclosure.

As shown in FIG. 5, the projection lens assembly according to the exemplary implementations of the present disclosure includes, sequentially along an optical axis from a source-side to an image side, a first lens E1, a second lens E2, a third lens E3, a fourth lens E4, and a diaphragm STO.

The first lens E1 has a positive refractive power, a source-side surface S1 of the first lens E1 is a convex surface, and an image-side surface S2 of the first lens E1 is a concave surface. The second lens E2 has a negative refractive power, a source-side surface S3 of the second lens E2 is a concave surface, and an image-side surface S4 of the second lens E2 is a concave surface. The third lens E3 has a positive refractive power, a source-side surface S5 of the third lens E3 is a concave surface, and an image-side surface S6 of the third lens E3 is a convex surface. The fourth lens E4 has a positive refractive power, a source-side surface S7 of the fourth lens E4 is a concave surface, and an image-side surface S8 of the fourth lens E4 is a convex surface. A light transmittance of the projection lens assembly is greater than 85% in a light wave range from about 800 nm to about 1000 nm. Light from an image source sequentially passes through the surfaces S1-S8 and finally forms an image on, for example, the projection plane of a projection screen (not shown).

Table 7 shows the surface type, the radius of curvature, the thickness, the material and the conic coefficient of each lens of the projection lens assembly in the third embodiment. The units of the radius of curvature and the thickness are both millimeters (mm).

TABLE 7

| surface number | surface type | radius of curvature | thickness | material refractive index | abbe number | conic coefficient |
|---|---|---|---|---|---|---|
| OBJ | spherical | infinite | 0.4900 | | | |
| S1 | aspheric | 0.8353 | 0.5530 | 1.63 | 20.4 | −0.2288 |
| S2 | aspheric | 4.2803 | 0.6475 | | | 0.0000 |
| S3 | aspheric | −0.6368 | 0.2200 | 1.63 | 20.4 | 0.0000 |
| S4 | aspheric | 1.3010 | 0.4514 | | | −2.7217 |
| S5 | aspheric | −2.4454 | 0.3875 | 1.62 | 23.5 | −60.0000 |
| S6 | aspheric | −1.5790 | 0.0350 | | | 3.1659 |
| S7 | aspheric | −1.8471 | 0.5456 | 1.76 | 49.6 | 3.7759 |
| S8 | aspheric | −1.0145 | −0.3776 | | | −0.6658 |
| STO | spherical | infinite | infinite | | | |
| IMA | spherical | infinite | | | | |

As may be obtained from Table 7, in the third embodiment, the source-side surface and the image-side surface of each lens in the first to fourth lenses E1-E4 are both aspheric surfaces. Table 8 shows the high-order coefficients applicable to each aspheric surface in the third embodiment. The surface type of each aspheric surface may be defined by the formula (1) given in the first embodiment.

TABLE 8

| surface number | A4 | A6 | A8 | A10 | A12 | A14 | A16 |
|---|---|---|---|---|---|---|---|
| S1 | 2.1828E−01 | −8.4239E−01 | 2.0193E+00 | −2.0745E+00 | 6.7952E−01 | 0.0000E+00 | 0.0000E+00 |
| S2 | −3.2000E−16 | 4.6500E−25 | −2.7000E−34 | 8.0100E−44 | −1.3000E−53 | 1.0200E−63 | −3.0000E−74 |
| S3 | −7.8373E−01 | 1.3882E+01 | −2.9568E+02 | 2.3124E+03 | −6.9984E+03 | 9.2250E+03 | −4.4563E+03 |
| S4 | 1.5988E+00 | −2.7821E+00 | 2.5120E+01 | −6.4877E+01 | 7.1942E+01 | −3.6901E+01 | 7.2038E+00 |
| S5 | −2.7637E−01 | 8.4123E−01 | −4.8490E−01 | 1.3481E−01 | −1.9930E−02 | 1.5060E−03 | −4.6000E−05 |
| S6 | −3.7548E−01 | −1.9231E+00 | 1.7355E+01 | −5.8802E+01 | 1.1541E+02 | −1.1717E+02 | 4.6130E+01 |
| S7 | −4.2447E−01 | −8.0749E−01 | 7.5516E+00 | −1.5598E+01 | 6.5587E+00 | 2.6534E+01 | −3.0344E+01 |
| S8 | −8.8690E−02 | −4.6500E−02 | 2.5370E−02 | −1.6914E−01 | 6.8726E−01 | −1.2376E+00 | 9.0872E−01 |

Table 9 shows the total effective focal length f of the projection lens assembly in the third embodiment, and the effective focal lengths f1-f4 of the lenses.

TABLE 9

| parameter | f (mm) | f1 (mm) | f2 (mm) | f3 (mm) | f4 (mm) |
|---|---|---|---|---|---|
| numerical value | 4.49 | 1.54 | −0.65 | 6.18 | 2.31 |

Figure 6:
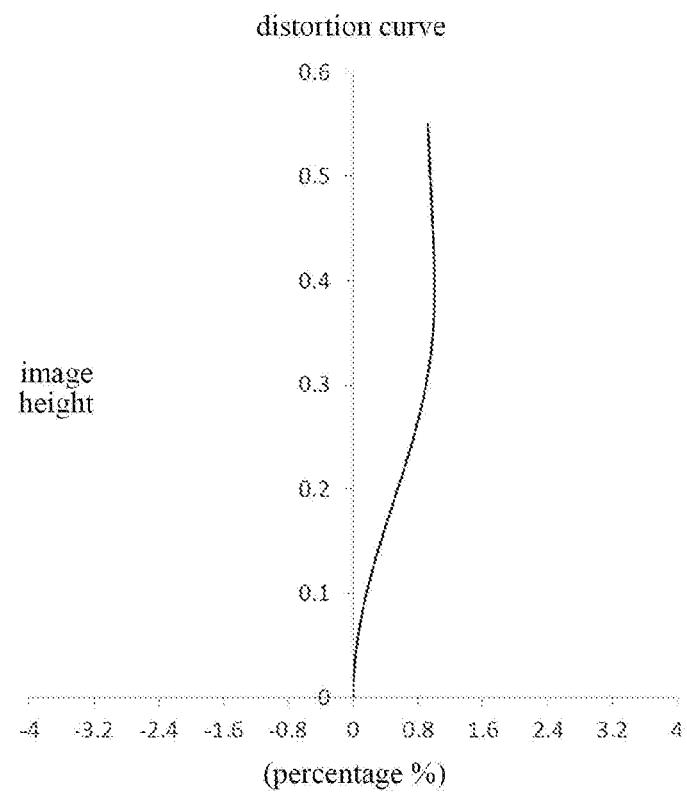
FIG. 6 illustrates a distortion curve of the projection lens assembly according to the third embodiment.

FIG. 6 illustrates the distortion curve of the projection lens assembly according to the third embodiment, representing amounts of distortion at different viewing angles. It can be seen from FIG. 6 that the projection lens assembly according to the third embodiment can achieve a good imaging quality.

Fourth Embodiment

Figure 7:
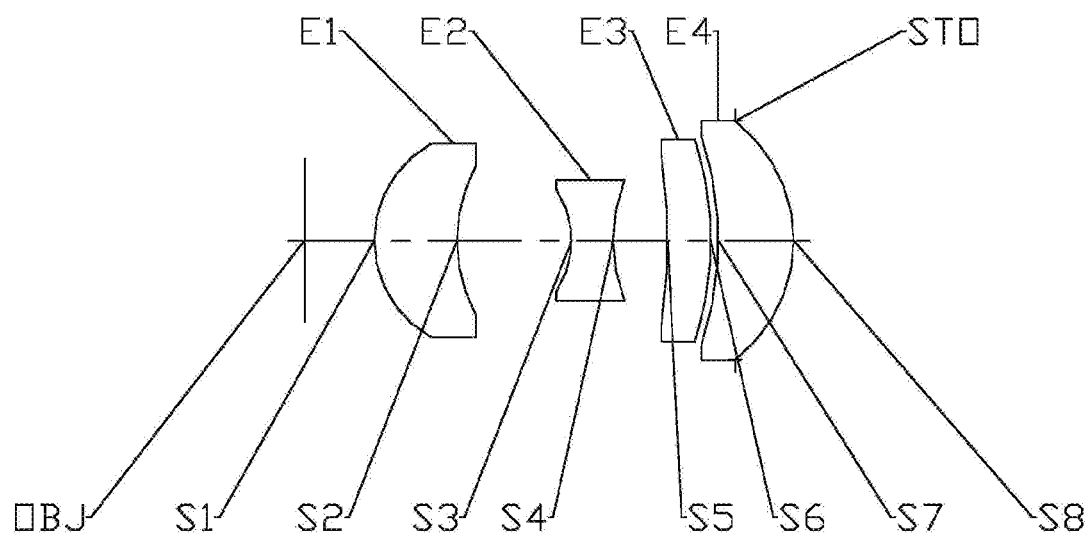
FIG. 7 is a schematic structural diagram illustrating a projection lens assembly according to a fourth embodiment of the present disclosure.

A projection lens assembly according to a fourth embodiment of the present disclosure is described below with reference to FIGS. 7-8. FIG. 7 is a schematic structural diagram illustrating the projection lens assembly according to the fourth embodiment of the present disclosure.

As shown in FIG. 7, the projection lens assembly according to the exemplary implementations of the present disclosure includes, sequentially along an optical axis from a source-side to an image side, a first lens E1, a second lens E2, a third lens E3, a fourth lens E4, and a diaphragm STO.

The first lens E1 has a positive refractive power, a source-side surface S1 of the first lens E1 is a convex surface, and an image-side surface S2 of the first lens E1 is a concave surface. The second lens E2 has a negative refractive power, a source-side surface S3 of the second lens E2 is a concave surface, and an image-side surface S4 of the second lens E2 is a concave surface. The third lens E3 has a positive refractive power, a source-side surface S5 of the third lens E3 is a concave surface, and an image-side surface S6 of the third lens E3 is a convex surface. The fourth lens E4 has a positive refractive power, a source-side surface S7 of the fourth lens E4 is a concave surface, and an image-side surface S8 of the fourth lens E4 is a convex surface. A light transmittance of the projection lens assembly is greater than 85% in a light wave range from about 800 nm to about 1000 nm. Light from an image source sequentially passes through the surfaces S1-S8 and finally forms an image on, for example, the projection plane of a projection screen (not shown).

Table 10 shows the surface type, the radius of curvature, the thickness, the material and the conic coefficient of each lens of the projection lens assembly in the fourth embodiment. The units of the radius of curvature and the thickness are both millimeters (mm).

TABLE 10

| surface number | surface type | radius of curvature | thickness | material refractive index | material abbe number | conic coefficient |
|---|---|---|---|---|---|---|
| OBJ | spherical | infinite | 0.4700 | | | |
| S1 | aspheric | 0.8791 | 0.5585 | 1.66 | 20.4 | 0.0414 |
| S2 | aspheric | 2.5988 | 0.7737 | | | 0.0000 |
| S3 | aspheric | −0.6775 | 0.2800 | 1.66 | 20.4 | 0.0000 |
| S4 | aspheric | 1.3727 | 0.3675 | | | −27.1896 |
| S5 | aspheric | −2.6756 | 0.2919 | 1.64 | 23.5 | −60.0000 |
| S6 | aspheric | −1.7849 | 0.0500 | | | 4.2188 |
| S7 | spherical | −2.2406 | 0.5082 | 1.82 | 23.8 | 0.0000 |
| S8 | spherical | −1.0173 | −0.3912 | | | 0.0000 |
| STO | spherical | infinite | infinite | | | |
| IMA | spherical | infinite | | | | |

As may be obtained from Table 10, in the fourth embodiment, the source-side surface and the image-side surface of each lens in the first to third lenses E1-E3 are both aspheric surfaces. Table 11 shows the high-order coefficients applicable to each aspheric surface in the fourth embodiment. The surface type of each aspheric surface may be defined by the formula (1) given in the first embodiment.

TABLE 11

| surface number | A4 | A6 | A8 | A10 | A12 | A14 | A16 |
|---|---|---|---|---|---|---|---|
| S1 | 5.9190E−01 | −9.5682E−01 | 1.5246E+00 | 1.4408E+00 | −1.8549E+00 | 0.0000E+00 | 0.0000E+00 |
| S2 | 6.7315E−01 | 5.7754E+00 | −6.1253E+01 | 4.1049E+02 | −1.2852E+03 | 1.8107E+03 | −9.4551E+02 |
| S3 | −6.1430E−02 | −1.4837E+01 | 5.6080E+02 | −1.2459E+04 | 1.4614E+05 | −8.9912E+05 | 2.2470E+06 |
| S4 | 1.7728E+00 | −7.6106E+00 | 9.0300E+01 | −1.0970E+03 | 8.7712E+03 | −3.8775E+04 | 7.1022E+04 |
| S5 | −3.5555E−01 | 8.0956E−01 | 8.4511E+00 | −7.6330E+01 | 3.0721E+02 | −5.9416E+02 | 4.4787E+02 |
| S6 | 1.4957E−01 | −7.1230E−02 | 2.7423E+00 | −1.2480E+01 | 3.4176E+01 | −4.7353E+01 | 2.8473E+01 |

Table 12 shows the total effective focal length f of the projection lens assembly in the fourth embodiment, and the effective focal lengths f1-f4 of the lenses.

TABLE 12

| parameter | f (mm) | f1 (mm) | f2 (mm) | f3 (mm) | f4 (mm) |
|---|---|---|---|---|---|
| numerical value | 4.49 | 1.86 | −0.68 | 7.74 | 1.92 |

Figure 8:
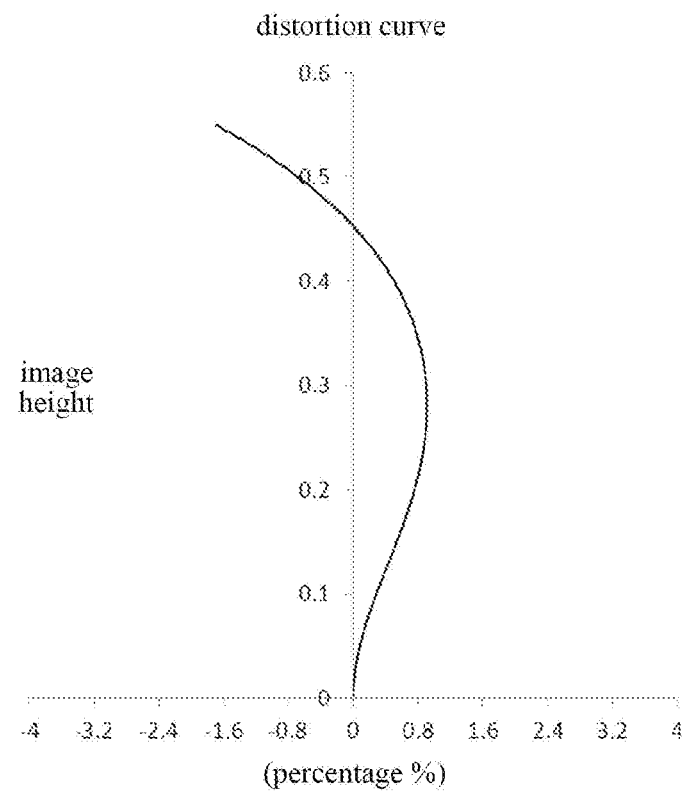
FIG. 8 illustrates a distortion curve of the projection lens assembly according to the fourth embodiment.

FIG. 8 illustrates the distortion curve of the projection lens assembly according to the fourth embodiment, representing amounts of distortion at different viewing angles. It can be seen from FIG. 8 that the projection lens assembly according to the fourth embodiment can achieve a good imaging quality.

Fifth Embodiment

Figure 9:
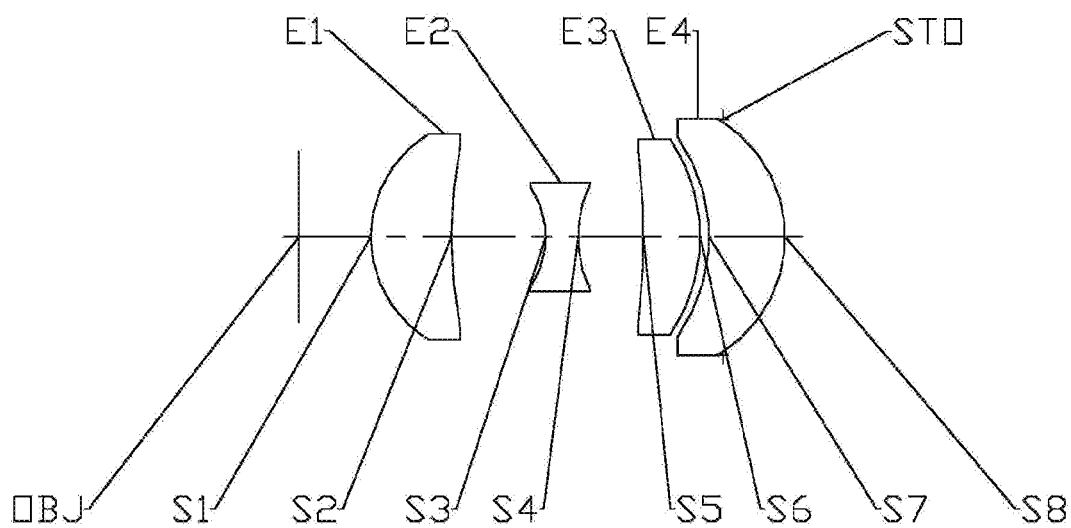
FIG. 9 is a schematic structural diagram illustrating a projection lens assembly according to a fifth embodiment of the present disclosure.

A projection lens assembly according to a fifth embodiment of the present disclosure is described below with reference to FIGS. 9-10. FIG. 9 is a schematic structural diagram illustrating the projection lens assembly according to the fifth embodiment of the present disclosure.

As shown in FIG. 9, the projection lens assembly according to the exemplary implementations of the present disclosure includes, sequentially along an optical axis from a source-side to an image side, a first lens E1, a second lens E2, a third lens E3, a fourth lens E4, and a diaphragm STO.

The first lens E1 has a positive refractive power, a source-side surface S1 of the first lens E1 is a convex surface, and an image-side surface S2 of the first lens E1 is a concave surface. The second lens E2 has a negative refractive power, a source-side surface S3 of the second lens E2 is a concave surface, and an image-side surface S4 of the second lens E2 is a concave surface. The third lens E3 has a positive refractive power, a source-side surface S5 of the third lens E3 is a concave surface, and an image-side surface S6 of the third lens E3 is a convex surface. The fourth lens E4 has a positive refractive power, a source-side surface S7 of the fourth lens E4 is a concave surface, and an image-side surface S8 of the fourth lens E4 is a convex surface. A light transmittance of the projection lens assembly is greater than 85% in a light wave range from about 800 nm to about 1000 nm. Light from an image source sequentially passes through the surfaces S1-S8 and finally forms an image on, for example, the projection plane of a projection screen (not shown).

Table 13 shows the surface type, the radius of curvature, the thickness, the material and the conic coefficient of each lens of the projection lens assembly in the fifth embodiment. The units of the radius of curvature and the thickness are both millimeters (mm).

TABLE 13

| surface number | surface type | radius of curvature | thickness | material refractive index | abbe number | conic coefficient |
|---|---|---|---|---|---|---|
| OBJ | spherical | infinite | 0.4920 | | | |
| S1 | aspheric | 0.8305 | 0.5530 | 1.66 | 20.4 | −0.7436 |
| S2 | aspheric | 3.9866 | 0.6475 | | | 0.0000 |
| S3 | aspheric | −0.6444 | 0.2200 | 1.66 | 20.4 | 0.0000 |
| S4 | aspheric | 1.4113 | 0.4494 | | | −116.0510 |
| S5 | aspheric | −1.7664 | 0.3882 | 1.64 | 23.5 | −60.0000 |
| S6 | aspheric | −1.4512 | 0.0604 | | | 2.8740 |
| S7 | aspheric | −2.3269 | 0.5215 | 1.66 | 20.4 | 9.3918 |
| S8 | aspheric | −0.9555 | −0.4256 | | | 0.2093 |
| STO | spherical | infinite | infinite | | | |
| IMA | spherical | infinite | | | | |

As may be obtained from Table 13, in the fifth embodiment, the source-side surface and the image-side surface of each lens in the first to fourth lenses E1-E4 are both aspheric surfaces. Table 14 shows the high-order coefficients applicable to each aspheric surface in the fifth embodiment. The surface type of each aspheric surface may be defined by the formula (1) given in the first embodiment.

Table 15 shows the total effective focal length f of the projection lens assembly in the fifth embodiment, and the effective focal lengths f1-f4 of the lenses.

TABLE 15

| parameter | f (mm) | f1 (mm) | f2 (mm) | f3 (mm) | f4 (mm) |
|---|---|---|---|---|---|
| numerical value | 4.47 | 1.55 | −0.67 | 8.98 | 2.23 |

Figure 10:
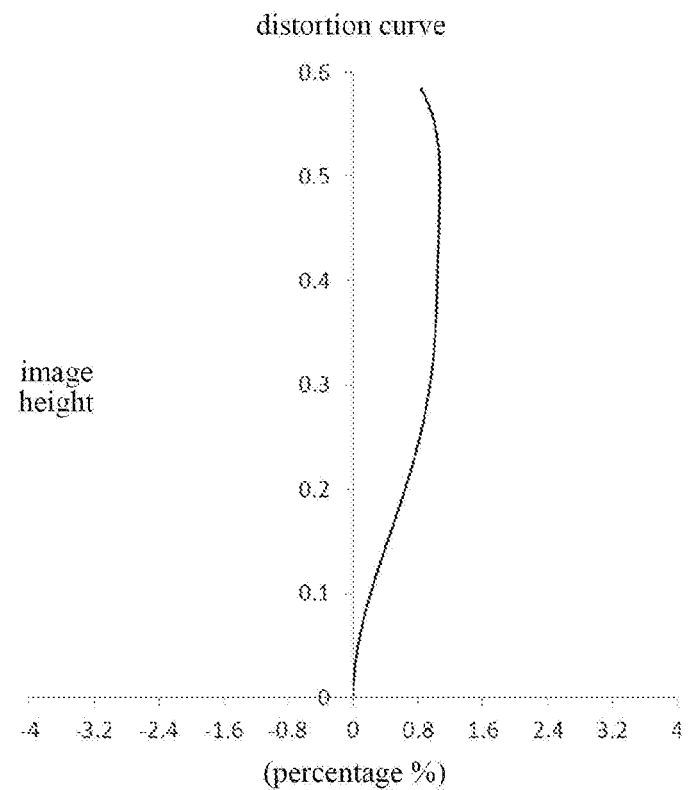
FIG. 10 illustrates a distortion curve of the projection lens assembly according to the fifth embodiment.

FIG. 10 illustrates the distortion curve of the projection lens assembly according to the fifth embodiment, representing amounts of distortion at different viewing angles. It can be seen from FIG. 10 that the projection lens assembly according to the fifth embodiment can achieve a good imaging quality.

Sixth Embodiment

Figure 11:
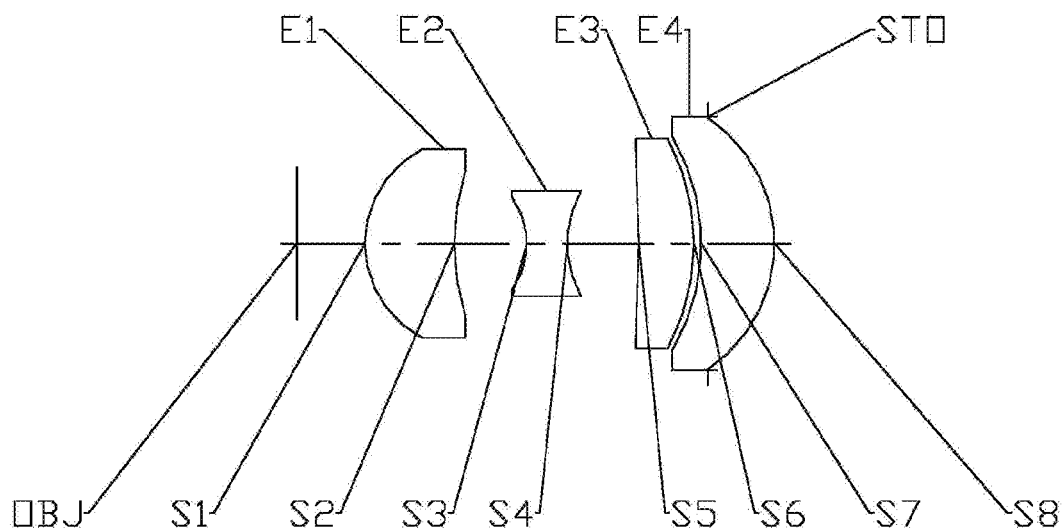
FIG. 11 is a schematic structural diagram illustrating a projection lens assembly according to a sixth embodiment of the present disclosure.

A projection lens assembly according to a sixth embodiment of the present disclosure is described below with reference to FIGS. 11-12. FIG. 11 is a schematic structural diagram illustrating the projection lens assembly according to the sixth embodiment of the present disclosure.

As shown in FIG. 11, the projection lens assembly according to the exemplary implementations of the present disclosure includes, sequentially along an optical axis from a source-side to an image side, a first lens E1, a second lens E2, a third lens E3, a fourth lens E4, and a diaphragm STO.

The first lens E1 has a positive refractive power, a source-side surface S1 of the first lens E1 is a convex surface, and an image-side surface S2 of the first lens E1 is a concave surface. The second lens E2 has a negative refractive power, a source-side surface S3 of the second lens E2 is a concave surface, and an image-side surface S4 of the second lens E2 is a concave surface. The third lens E3 has a positive refractive power, a source-side surface S5 of the third lens E3 is a concave surface, and an image-side surface S6 of the third lens E3 is a convex surface. The fourth lens E4 has a positive refractive power, a source-side surface S7 of the fourth lens E4 is a concave surface, and an image-side surface S8 of the fourth lens E4 is a convex surface. A light transmittance of the projection lens assembly is greater than 85% in a light wave range from about 800 nm to about 1000 nm. Light from an image source sequentially passes through the surfaces S1-S8 and finally forms an image on, for example, the projection plane of a projection screen (not shown).

TABLE 14

| surface number | A4 | A6 | A8 | A10 | A12 | A14 | A16 |
|---|---|---|---|---|---|---|---|
| S1 | 3.6680E−01 | −3.6954E−01 | −1.8866E−01 | 5.9421E+00 | −8.9292E+00 | 0.0000E+00 | 0.0000E+00 |
| S2 | 1.6699E−01 | 1.8126E+00 | −2.5869E+01 | 1.8203E+02 | −6.4777E+02 | 1.0744E+03 | −6.7169E+02 |
| S3 | 1.1579E+00 | −1.5512E+01 | 3.0118E+02 | −9.6116E+03 | 1.4343E+05 | −1.0553E+06 | 3.0382E+06 |
| S4 | 7.4835E+00 | −1.0085E+02 | 1.7141E+03 | −2.2154E+04 | 1.7805E+05 | −7.8965E+05 | 1.4717E+06 |
| S5 | −1.1910E+00 | 1.2392E+01 | −6.2949E+01 | 2.0999E+02 | −4.3731E+02 | 5.2803E+02 | −2.9109E+02 |
| S6 | −2.0113E+00 | 1.4239E+01 | −4.5196E+01 | 5.9416E+01 | 2.3048E+01 | −1.1793E+02 | 7.6403E+01 |
| S7 | −2.1286E+00 | 1.4956E+01 | −5.9598E+01 | 1.3375E+02 | −1.6367E+02 | 8.9599E+01 | 1.3380E+00 |
| S8 | −7.5840E−02 | 4.9683E−01 | −1.7375E−01 | −6.0831E+00 | 2.3009E+01 | −3.3952E+01 | 1.8892E+01 |

Table 16 shows the surface type, the radius of curvature, the thickness, the material and the conic coefficient of each lens of the projection lens assembly in the sixth embodiment. The units of the radius of curvature and the thickness are both millimeters (mm).

TABLE 16

| surface number | surface type | radius of curvature | thickness | refractive index | abbe number | conic coefficient |
|---|---|---|---|---|---|---|
| OBJ | spherical | infinite | 0.4700 | | | |
| S1 | aspheric | 0.8613 | 0.6183 | 1.66 | 20.4 | −0.1472 |
| S2 | aspheric | 8.1437 | 0.4999 | | | 0.0000 |
| S3 | aspheric | −0.5712 | 0.2800 | 1.66 | 20.4 | 0.0000 |
| S4 | aspheric | 0.8594 | 0.4945 | | | −12.1134 |
| S5 | aspheric | −2.6071 | 0.3805 | 1.54 | 55.8 | −60.0000 |
| S6 | aspheric | −1.7515 | 0.0500 | | | 4.3650 |
| S7 | aspheric | −2.1260 | 0.5068 | 1.86 | 37.2 | 4.1869 |
| S8 | aspheric | −1.0716 | −0.4615 | | | −0.2863 |
| STO | spherical | infinite | infinite | | | |
| IMA | spherical | infinite | | | | |

As may be obtained from Table 16, in the sixth embodiment, the source-side surface and the image-side surface of each lens in the first to fourth lenses E1-E4 are both aspheric surfaces. Table 17 shows the high-order coefficients applicable to each aspheric surface in the sixth embodiment. The surface type of each aspheric surface may be defined by the formula (1) given in the first embodiment.

TABLE 17

| surface number | A4 | A6 | A8 | A10 | A12 | A14 | A16 |
|---|---|---|---|---|---|---|---|
| S1 | 7.7309E−01 | −1.2329E+00 | 1.5965E+00 | 6.2851E+00 | −1.3052E+01 | 0.0000E+00 | 0.0000E+00 |
| S2 | 9.4646E−01 | 5.7194E+00 | −1.0454E+02 | 1.0912E+03 | −5.6163E+03 | 1.2871E+04 | −1.0593E+04 |
| S3 | 8.1481E−01 | 1.6495E+01 | −1.2105E+03 | 2.5863E+04 | −2.9970E+05 | 1.6837E+06 | −3.4325E+06 |
| S4 | 3.9765E+00 | −2.6956E+01 | 2.7356E+02 | −3.5215E+03 | 3.2010E+04 | −1.6161E+05 | 3.4395E+05 |
| S5 | −3.5554E−01 | 2.6437E+00 | −1.5112E+01 | 7.9214E+01 | −2.3434E+02 | 3.5795E+02 | −2.1981E+02 |
| S6 | −2.3670E−02 | −3.0676E+00 | 3.4836E+01 | −1.9511E+02 | 5.7765E+02 | −8.3985E+02 | 4.8062E+02 |
| S7 | −2.8650E−02 | −1.8915E+00 | 1.7194E+01 | −8.4513E+01 | 2.1753E+02 | −2.7457E+02 | 1.3378E+02 |
| S8 | −2.2260E−02 | −1.4160E−02 | −4.6485E−01 | 2.4129E+00 | −6.2830E+00 | 7.6431E+00 | −3.5857E+00 |

Table 18 shows the total effective focal length f of the projection lens assembly in the sixth embodiment, and the effective focal lengths f1-f4 of the lenses.

TABLE 18

| parameter | f (mm) | f1 (mm) | f2 (mm) | f3 (mm) | f4 (mm) |
|---|---|---|---|---|---|
| numerical value | 4.90 | 1.47 | −0.50 | 8.80 | 2.05 |

Figure 12:
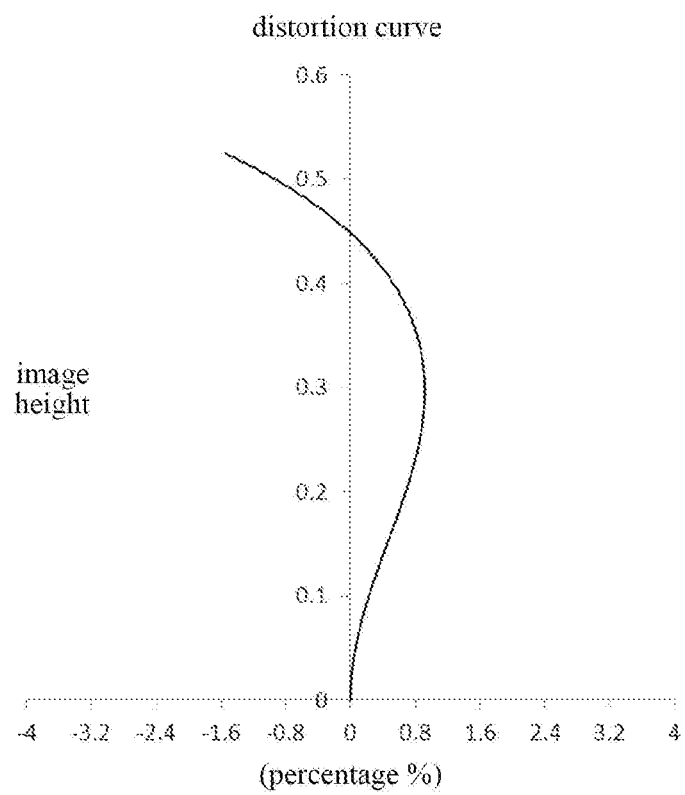
FIG. 12 illustrates a distortion curve of the projection lens assembly according to the sixth embodiment.

FIG. 12 illustrates the distortion curve of the projection lens assembly according to the sixth embodiment, representing amounts of distortion at different viewing angles. It can be seen from FIG. 12 that the projection lens assembly according to the sixth embodiment can achieve a good imaging quality.

Seventh Embodiment

Figure 13:
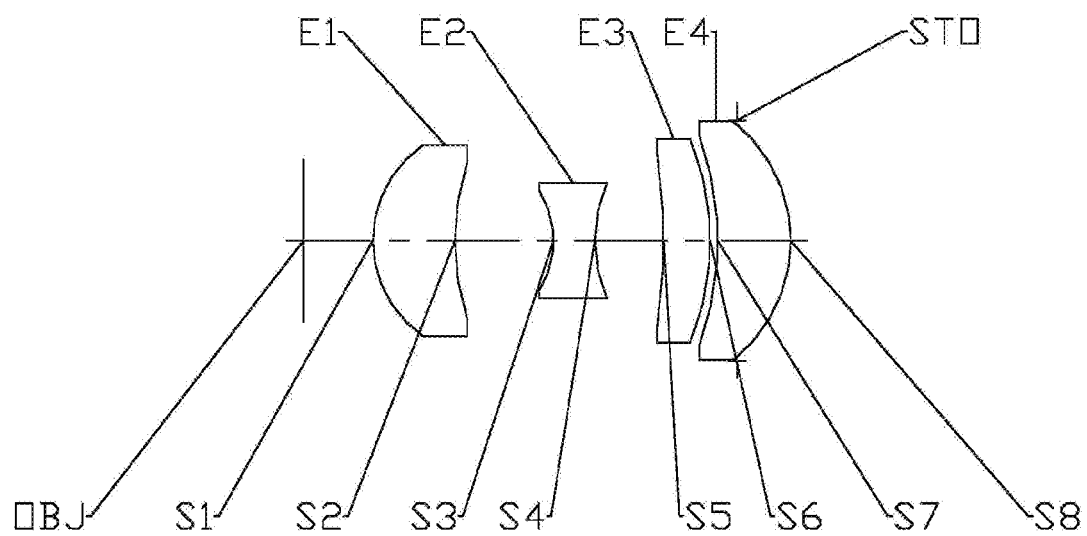
FIG. 13 is a schematic structural diagram illustrating a projection lens assembly according to a seventh embodiment of the present disclosure.

A projection lens assembly according to a seventh embodiment of the present disclosure is described below with reference to FIGS. 13-14. FIG. 13 is a schematic structural diagram illustrating the projection lens assembly according to the seventh embodiment of the present disclosure.

As shown in FIG. 13, the projection lens assembly according to the exemplary implementations of the present disclosure includes, sequentially along an optical axis from a source-side to an image side, a first lens E1, a second lens E2, a third lens E3, a fourth lens E4, and a diaphragm STO.

The first lens E1 has a positive refractive power, a source-side surface S1 of the first lens E1 is a convex surface, and an image-side surface S2 of the first lens E1 is a concave surface. The second lens E2 has a negative refractive power, a source-side surface S3 of the second lens E2 is a concave surface, and an image-side surface S4 of the second lens E2 is a concave surface. The third lens E3 has a positive refractive power, a source-side surface S5 of the third lens E3 is a concave surface, and an image-side surface S6 of the third lens E3 is a convex surface. The fourth lens E4 has a positive refractive power, a source-side surface S7 of the fourth lens E4 is a concave surface, and an image-side surface S8 of the fourth lens E4 is a convex surface. A light transmittance of the projection lens assembly is greater than 85% in a light wave range from about 800 nm to about 1000 nm. Light from an image source sequentially passes through the surfaces S1-S8 and finally forms an image on, for example, the projection plane of a projection screen (not shown).

Table 19 shows the surface type, the radius of curvature, the thickness, the material and the conic coefficient of each lens of the projection lens assembly in the seventh embodiment. The units of the radius of curvature and the thickness are both millimeters (mm).

TABLE 19

| surface number | surface type | radius of curvature | thickness | refractive index | abbe number | conic coefficient |
|---|---|---|---|---|---|---|
| OBJ | spherical | infinite | 0.4700 | | | |
| S1 | aspheric | 0.8792 | 0.5557 | 1.66 | 20.4 | −0.1283 |
| S2 | aspheric | 3.5445 | 0.6674 | | | 0.0000 |
| S3 | aspheric | −0.7276 | 0.2800 | 1.66 | 20.4 | 0.0000 |
| S4 | aspheric | 1.2129 | 0.4664 | | | −21.8715 |
| S5 | aspheric | −2.3466 | 0.3157 | 1.54 | 55.8 | −60.0000 |
| S6 | aspheric | −1.7694 | 0.0500 | | | 4.6484 |
| S7 | aspheric | −2.4112 | 0.4948 | 1.76 | 49.6 | 2.3950 |
| S8 | aspheric | −1.0141 | −0.3642 | | | −0.3236 |
| STO | spherical | infinite | infinite | | | |
| IMA | spherical | infinite | | | | |

As may be obtained from Table 19, in the seventh embodiment, the source-side surface and the image-side surface of each lens in the first to fourth lenses E1-E4 are both aspheric surfaces. Table 20 shows the high-order coefficients applicable to each aspheric surface in the seventh embodiment. The surface type of each aspheric surface may be defined by the formula (1) given in the first embodiment.

TABLE 17

| surface number | A4 | A6 | A8 | A10 | A12 | A14 | A16 |
|---|---|---|---|---|---|---|---|
| S1 | 4.8361E−01 | −3.2341E−01 | 2.6070E−01 | −3.1058E−01 | −9.5350E−02 | 0.0000E+00 | 0.0000E+00 |
| S2 | 4.5980E−01 | 4.4671E+00 | −4.1977E+01 | 2.5620E+02 | −1.0182E+03 | 2.0564E+03 | −1.5903E+03 |
| S3 | −1.9670E−01 | 1.0073E+01 | −6.5709E+02 | 1.4866E+04 | −1.9436E+05 | 1.3028E+06 | −3.4935E+06 |
| S4 | 2.4263E+00 | −4.4909E+00 | −1.3788E+02 | 3.0152E+03 | −3.0798E+04 | 1.5720E+05 | −3.1835E+05 |
| S5 | −5.6710E−01 | 4.6274E+00 | −3.0735E+01 | 1.7618E+02 | −6.1353E+02 | 1.1174E+03 | −8.1790E+02 |
| S6 | 1.8892E−01 | −1.0114E+00 | 1.0131E+01 | −5.1681E+01 | 1.5016E+02 | −2.2435E+02 | 1.3825E+02 |
| S7 | 1.2243E−01 | −1.3146E+00 | 9.3104E+00 | −4.0508E+01 | 9.3836E+01 | −1.0927E+02 | 5.0130E+01 |
| S8 | −5.0800E−03 | −1.0316E−01 | 2.0290E−01 | 1.4868E−01 | −2.2665E+00 | 3.9620E+00 | −2.2084E+00 |

Table 21 shows the total effective focal length f of the projection lens assembly in the seventh embodiment, and the effective focal lengths f1-f4 of the lenses.

TABLE 21

| parameter | f (mm) | f1 (mm) | f2 (mm) | f3 (mm) | f4 (mm) |
|---|---|---|---|---|---|
| numerical value | 4.50 | 1.71 | −0.68 | 11.51 | 2.00 |

Figure 14:
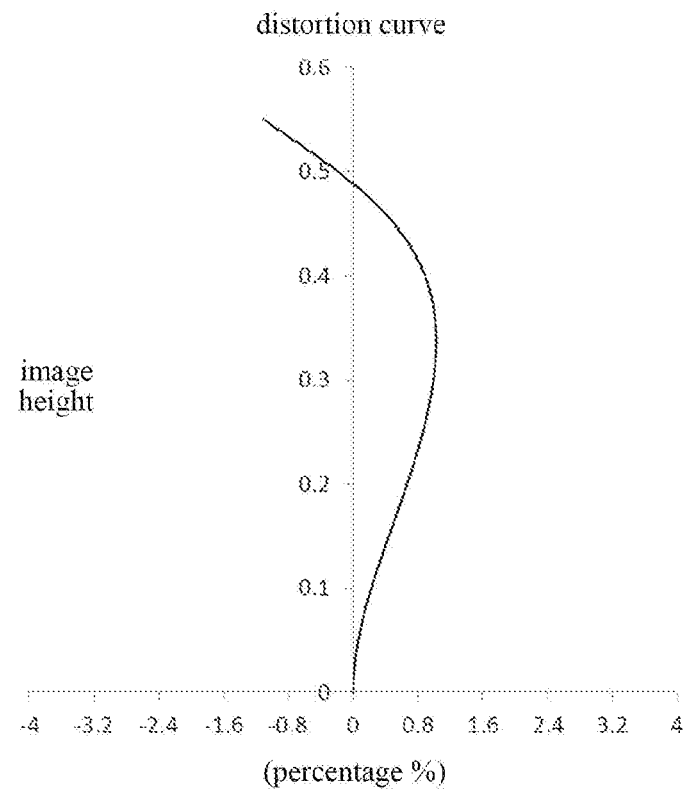
FIG. 14 illustrates a distortion curve of the projection lens assembly according to the seventh embodiment.

FIG. 14 illustrates the distortion curve of the projection lens assembly according to the seventh embodiment, representing amounts of distortion at different viewing angles. It can be seen from FIG. 14 that the projection lens assembly according to the seventh embodiment can achieve a good imaging quality.

Eighth Embodiment

Figure 15:
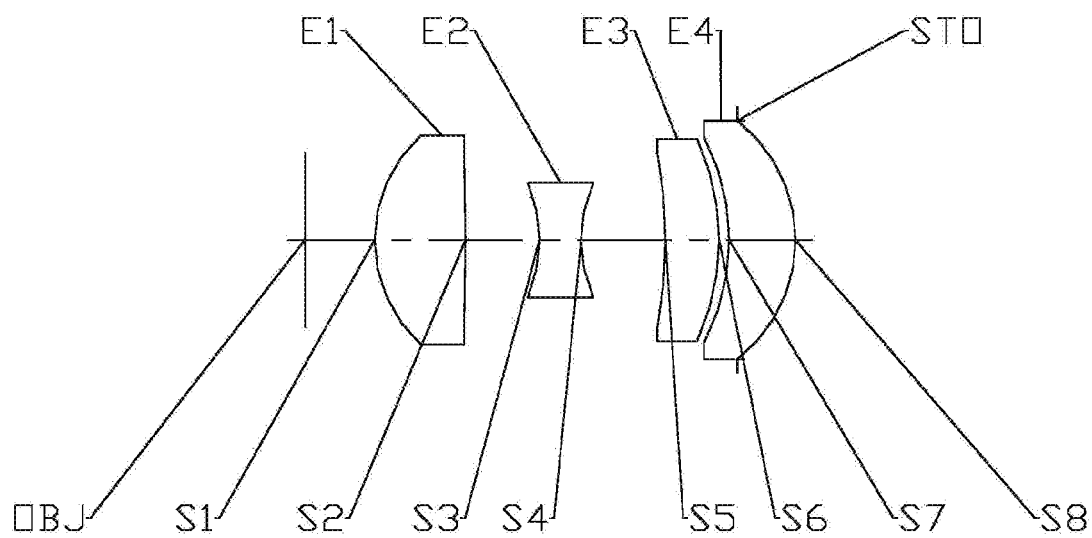
FIG. 15 is a schematic structural diagram illustrating a projection lens assembly according to an eighth embodiment of the present disclosure.

A projection lens assembly according to an eighth embodiment of the present disclosure is described below with reference to FIGS. 15-16. FIG. 15 is a schematic structural diagram illustrating the projection lens assembly according to the eighth embodiment of the present disclosure.

As shown in FIG. 15, the projection lens assembly according to the exemplary implementations of the present disclosure includes, sequentially along an optical axis from a source-side to an image side, a first lens E1, a second lens E2, a third lens E3, a fourth lens E4, and a diaphragm STO.

The first lens E1 has a positive refractive power, a source-side surface S1 of the first lens E1 is a convex surface, and an image-side surface S2 of the first lens E1 is a convex surface. The second lens E2 has a negative refractive power, a source-side surface S3 of the second lens E2 is a concave surface, and an image-side surface S4 of the second lens E2 is a concave surface. The third lens E3 has a positive refractive power, a source-side surface S5 of the third lens E3 is a concave surface, and an image-side surface S6 of the third lens E3 is a convex surface. The fourth lens E4 has a positive refractive power, a source-side surface S7 of the fourth lens E4 is a concave surface, and an image-side surface S8 of the fourth lens E4 is a convex surface. A light transmittance of the projection lens assembly is greater than 85% in a light wave range from about 800 nm to about 1000 nm. Light from an image source sequentially passes through the surfaces S1-S8 and finally forms an image on, for example, the projection plane of a projection screen (not shown).

Table 22 shows the surface type, the radius of curvature, the thickness, the material and the conic coefficient of each lens of the projection lens assembly in the eighth embodiment. The units of the radius of curvature and the thickness are both millimeters (mm).

TABLE 22

| surface number | surface type | radius of curvature | thickness | material refractive index | material abbe number | conic coefficient |
|---|---|---|---|---|---|---|
| OBJ | spherical | infinite | 0.4700 | | | |
| S1 | aspheric | 0.9545 | 0.6110 | 1.66 | 20.4 | 0.5592 |
| S2 | aspheric | −14.0366 | 0.4969 | | | 0.0000 |
| S3 | aspheric | −1.1836 | 0.2800 | 1.74 | 47.7 | 0.0000 |
| S4 | aspheric | 1.1399 | 0.5675 | | | −23.2762 |
| S5 | aspheric | −2.1723 | 0.3606 | 1.54 | 55.8 | −59.9999 |
| S6 | aspheric | −1.7141 | 0.0680 | | | 3.9766 |
| S7 | aspheric | −2.0344 | 0.4460 | 1.81 | 37.2 | 3.7315 |
| S8 | aspheric | −1.0563 | −0.3911 | | | −0.2036 |
| STO | spherical | infinite | infinite | | | |
| IMA | spherical | infinite | | | | |

As may be obtained from Table 22, in the eighth embodiment, the source-side surface and the image-side surface of each lens in the first to fourth lenses E1-E4 are both aspheric surfaces. Table 23 shows the high-order coefficients applicable to each aspheric surface in the eighth embodiment. The surface type of each aspheric surface may be defined by the formula (1) given in the first embodiment.

TABLE 23

| surface number | A4 | A6 | A8 | A10 | A12 | A14 | A16 |
|---|---|---|---|---|---|---|---|
| S1 | 2.0451E−01 | −7.6718E−01 | 1.3377E−01 | 3.0263E+00 | −7.9566E+00 | 0.0000E+00 | 0.0000E+00 |
| S2 | 3.9981E−01 | −1.2211E+00 | 4.9526E+00 | −1.7683E+01 | 3.8928E+00 | 5.0109E+01 | −4.2296E+01 |
| S3 | 1.3489E−01 | −7.5732E+00 | 5.2784E+01 | −8.8773E+02 | 9.8831E+03 | −6.1758E+04 | 1.6268E+05 |
| S4 | 3.0761E+00 | −2.1121E+01 | 2.3813E+02 | −2.9466E+03 | 2.6793E+04 | −1.3781E+05 | 2.9792E+05 |
| S5 | −6.1013E−01 | 4.1908E+00 | −1.7786E+01 | 5.3101E+01 | −8.4057E+01 | 3.3219E+01 | 4.2226E+01 |
| S6 | −4.0151E−01 | 2.4365E−01 | 1.8245E+01 | −1.1416E+02 | 3.3874E+02 | −4.9319E+02 | 2.8408E+02 |
| S7 | −3.4922E−01 | −1.1731E−01 | 1.0731E+01 | −5.9213E+01 | 1.5296E+02 | −1.9217E+02 | 9.2682E+01 |
| S8 | −5.8220E−02 | −2.9410E−02 | −8.0880E−02 | 1.1590E+00 | −4.7132E+00 | 7.4302E+00 | −4.3784E+00 |

Table 24 shows the total effective focal length f of the projection lens assembly in the eighth embodiment, and the effective focal lengths f1-f4 of the lenses.

TABLE 24

| parameter | f (mm) | f1 (mm) | f2 (mm) | f3 (mm) | f4 (mm) |
|---|---|---|---|---|---|
| numerical value | 4.00 | 1.43 | −0.74 | 12.16 | 2.24 |

Figure 16:
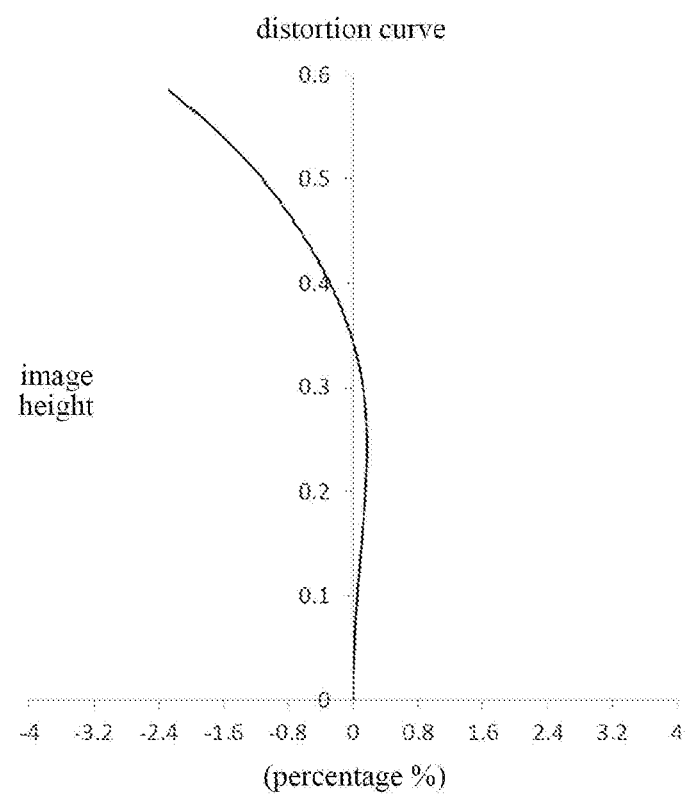
FIG. 16 illustrates a distortion curve of the projection lens assembly according to the eighth embodiment.

FIG. 16 illustrates the distortion curve of the projection lens assembly according to the eighth embodiment, representing amounts of distortion at different viewing angles. It can be seen from FIG. 16 that the projection lens assembly according to the eighth embodiment can achieve a good imaging quality.

Ninth Embodiment

Figure 17:
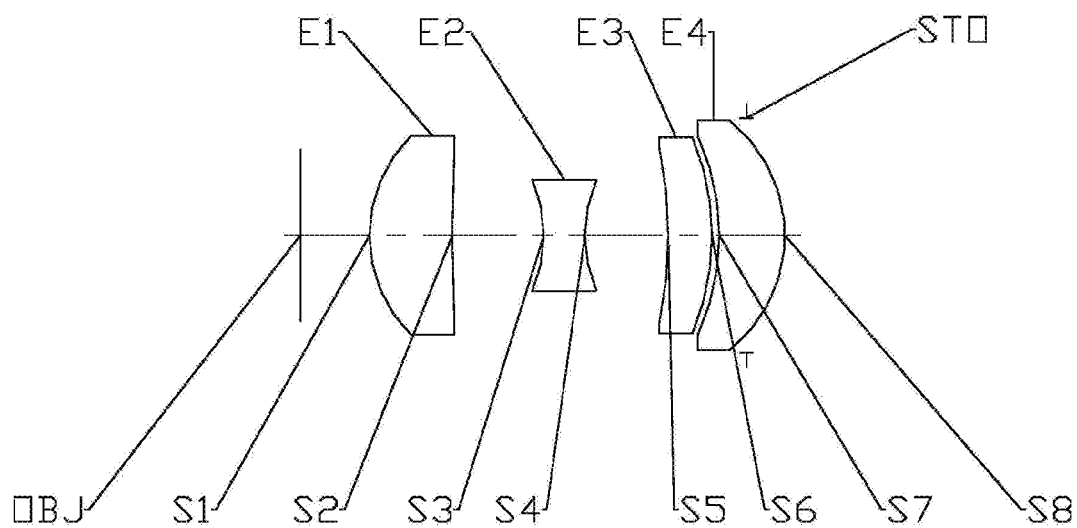
FIG. 17 is a schematic structural diagram illustrating a projection lens assembly according to a ninth embodiment of the present disclosure.

A projection lens assembly according to a ninth embodiment of the present disclosure is described below with reference to FIGS. 17-18. FIG. 17 is a schematic structural diagram illustrating the projection lens assembly according to the ninth embodiment of the present disclosure.

As shown in FIG. 17, the projection lens assembly according to the exemplary implementations of the present disclosure includes, sequentially along an optical axis from a source-side to an image side, a first lens E1, a second lens E2, a third lens E3, a fourth lens E4, and a diaphragm STO.

The first lens E1 has a positive refractive power, a source-side surface S1 of the first lens E1 is a convex surface, and an image-side surface S2 of the first lens E1 is a convex surface. The second lens E2 has a negative refractive power, a source-side surface S3 of the second lens E2 is a concave surface, and an image-side surface S4 of the second lens E2 is a concave surface. The third lens E3 has a positive refractive power, a source-side surface S5 of the third lens E3 is a concave surface, and an image-side surface S6 of the third lens E3 is a convex surface. The fourth lens E4 has a positive refractive power, a source-side surface S7 of the fourth lens E4 is a concave surface, and an image-side surface S8 of the fourth lens E4 is a convex surface. A light transmittance of the projection lens assembly is greater than 85% in a light wave range from about 800 nm to about 1000 nm. Light from an image source sequentially passes through the surfaces S1-S8 and finally forms an image on, for example, the projection plane of a projection screen (not shown).

Table 25 shows the surface type, the radius of curvature, the thickness, the material and the conic coefficient of each lens of the projection lens assembly in the ninth embodiment. The units of the radius of curvature and the thickness are both millimeters (mm).

TABLE 25

| surface number | surface type | radius of curvature | thickness | material refractive index | material abbe number | conic coefficient |
|---|---|---|---|---|---|---|
| OBJ | spherical | infinite | 0.4700 | | | |
| S1 | aspheric | 1.0328 | 0.5651 | 1.66 | 20.4 | 0.8272 |
| S2 | aspheric | −50.1267 | 0.6226 | | | 0.0000 |
| S3 | aspheric | −1.0832 | 0.2800 | 1.74 | 47.7 | 0.0000 |
| S4 | aspheric | 1.2237 | 0.5676 | | | −25.6724 |
| S5 | aspheric | −1.9027 | 0.2983 | 1.54 | 55.8 | −60.0006 |
| S6 | aspheric | −1.7319 | 0.0500 | | | 3.8775 |
| S7 | aspheric | −2.1769 | 0.4464 | 1.81 | 37.2 | 3.2200 |
| S8 | aspheric | −1.0282 | −0.2625 | | | −0.2111 |
| STO | spherical | infinite | infinite | | | |
| IMA | spherical | infinite | | | | |

As may be obtained from Table 25, in the ninth embodiment, the source-side surface and the image-side surface of each lens in the first to fourth lenses E1-E4 are both aspheric surfaces. Table 26 shows the high-order coefficients applicable to each aspheric surface in the ninth embodiment. The surface type of each aspheric surface may be defined by the formula (1) given in the first embodiment.

TABLE 26

| surface number | A4 | A6 | A8 | A10 | A12 | A14 | A16 |
|---|---|---|---|---|---|---|---|
| S1 | 3.6323E−01 | −9.6699E−01 | 1.9994E−01 | 2.8178E+00 | −7.4025E+00 | 0.0000E+00 | 0.0000E+00 |
| S2 | 4.4282E−01 | −1.3810E−01 | −4.5518E+00 | 2.8758E+01 | −1.2061E+02 | 2.1459E+02 | −1.2413E+02 |
| S3 | 3.3197E−01 | −9.9161E+00 | 1.0597E+02 | −1.7647E+03 | 1.8742E+04 | −1.1157E+05 | 2.8453E+05 |
| S4 | 3.0244E+00 | −1.9525E+01 | 2.1702E+02 | −2.7327E+03 | 2.5851E+04 | −1.3854E+05 | 3.1237E+05 |
| S5 | −9.2369E−01 | 7.0146E+00 | −3.5276E+01 | 1.2828E+02 | −2.9140E+02 | 3.6266E+02 | −1.7435E+02 |
| S6 | −3.6876E−01 | −7.5200E−03 | 2.3023E+01 | −1.4295E+02 | 4.3183E+02 | −6.6276E+02 | 4.1416E+02 |
| S7 | −3.3232E−01 | −1.4068E−01 | 1.2417E+01 | −7.2617E+01 | 2.0287E+02 | −2.8620E+02 | 1.6007E+02 |
| S8 | −4.6560E−02 | −3.6610E−02 | −1.1030E−02 | 6.6582E−01 | −3.3885E+00 | 6.1323E+00 | −4.2951E+00 |

Table 27 shows the total effective focal length f of the projection lens assembly in the ninth embodiment, and the effective focal lengths f1-f4 of the lenses.

TABLE 27

| parameter | f (mm) | f1 (mm) | f2 (mm) | f3 (mm) | f4 (mm) |
|---|---|---|---|---|---|
| numerical value | 4.25 | 1.61 | −0.74 | 22.92 | 2.04 |

Figure 18:
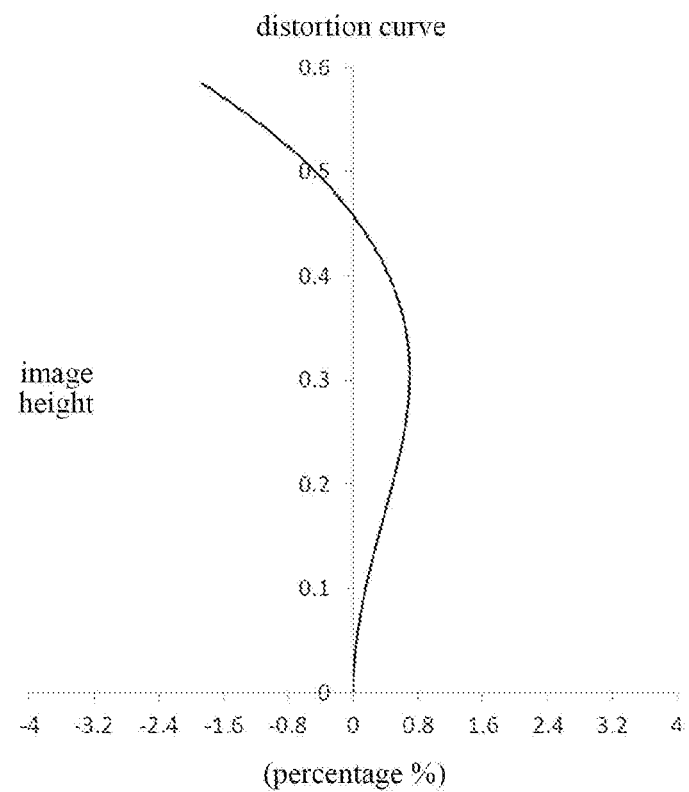
FIG. 18 illustrates a distortion curve of the projection lens assembly according to the ninth embodiment.

FIG. 18 illustrates the distortion curve of the projection lens assembly according to the ninth embodiment, representing amounts of distortion at different viewing angles. It can be seen from FIG. 18 that the projection lens assembly according to the ninth embodiment can achieve a good imaging quality.

To sum up, Embodiments 1-9 respectively satisfy the relationships shown in Table 28 below.

TABLE 28

| Conditional Expression | Embodiment | | | | | | | | |
|---|---|---|---|---|---|---|---|---|---|
| | 1 | 2 | 3 | 4 | 5 | 6 | 7 | 8 | 9 |
| f/f2 | −7.63 | −6.72 | −6.91 | −6.60 | −6.67 | −9.80 | −6.62 | −5.41 | −5.74 |
| f/f1 | 3.10 | 3.00 | 2.92 | 2.41 | 2.88 | 3.33 | 2.63 | 2.80 | 2.64 |
| f3/f | 1.32 | 1.46 | 1.38 | 1.72 | 2.01 | 1.80 | 2.56 | 3.04 | 5.39 |
| R8/R1 | −1.35 | −1.29 | −1.21 | −1.16 | −1.15 | −1.24 | −1.15 | −1.11 | −1.00 |
| f/f4 | 1.95 | 1.63 | 1.94 | 2.34 | 2.00 | 2.39 | 2.25 | 1.79 | 2.08 |
| R4/R3 | −1.25 | −1.03 | −2.04 | −2.03 | −2.19 | −1.50 | −1.67 | −0.96 | −1.13 |
| T12/T23 | 0.91 | 0.96 | 1.43 | 2.11 | 1.44 | 1.01 | 1.43 | 0.88 | 1.10 |
| CT4/CT2 | 2.14 | 2.82 | 2.48 | 1.82 | 2.37 | 1.81 | 1.77 | 1.59 | 1.59 |
| DT42/DT41 | 1.19 | 1.19 | 1.18 | 1.14 | 1.18 | 1.19 | 1.13 | 1.15 | 1.15 |
| TTL/f | 0.73 | 0.74 | 0.74 | 0.73 | 0.75 | 0.67 | 0.73 | 0.82 | 0.78 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A projection lens assembly comprising, sequentially along an optical axis from a source-side to an image side,
a first lens having a positive refractive power;
a second lens having a negative refractive power, wherein a source-side surface and an image-side surface of the second lens are concave surfaces;
a third lens having a positive refractive power or a negative refractive power; and
a fourth lens having a positive refractive power, wherein an image-side surface of the fourth lens is a convex surface;
wherein a total effective focal length f of the projection lens assembly and an effective focal length f1 of the first lens satisfy: 2.0<f/f1<3.5.

2. The projection lens assembly according to claim 1, wherein a center thickness CT4 of the fourth lens on the optical axis and a center thickness CT2 of the second lens on the optical axis satisfy: 1.5<CT4/CT2<3.0.

3. The projection lens assembly according to claim 1, wherein a spacing distance T12 on the optical axis between the first lens and the second lens and a spacing distance T23 on the optical axis between the second lens and the third lens satisfy: 0.8<T12/T23<2.2.

4. The projection lens assembly according to claim 1, wherein a radius R8 of curvature of the image-side surface of the fourth lens and a radius R1 of curvature of a source-side surface of the first lens satisfy: −1.5≤R8/R1≤−1.0.

5. The projection lens assembly according to claim 1, wherein a radius R4 of curvature of the image-side surface of the second lens and a radius R3 of curvature of the source-side surface of the second lens satisfy: −2.4<R4/R3<−0.8.

6. The projection lens assembly according to claim 1, wherein the total effective focal length f of the projection lens assembly and an effective focal length f2 of the second lens satisfy: f/f2≤−4.0.

7. The projection lens assembly according to claim 4, wherein the total effective focal length f of the projection lens assembly and an effective focal length f4 of the fourth lens satisfy: 1.5<f/f4<2.5.

8. The projection lens assembly according to claim 1, wherein the third lens has a positive refractive power, wherein an effective focal length f3 of the third lens and the total effective focal length f of the projection lens assembly satisfy: 1.0<f3/f<5.5.

9. The projection lens assembly according to claim 1, wherein a maximum effective semi-diameter DT42 of the image-side surface of the fourth lens and a maximum effective semi-diameter DT41 of a source-side surface of the fourth lens satisfy: 1.0<DT42/DT41<1.4.

10. The projection lens assembly according to claim 1, wherein a light transmittance of the projection lens assembly is greater than 85% in a light wave range from 800 nm to 1000 nm.

11. The projection lens assembly according to claim 1, wherein a distance TTL on the optical axis from a source plane of the projection lens assembly to the image-side surface of the fourth lens and the total effective focal length f of the projection lens assembly satisfy: TTL/f<1.0.

12. A projection lens assembly comprising, sequentially along an optical axis from a source-side to an image side,
a first lens having a positive refractive power;
a second lens having a negative refractive power, wherein a source-side surface and an image-side surface of the second lens are concave surfaces;
a third lens having a positive refractive power or a negative refractive power; and
a fourth lens having a positive refractive power, wherein an image-side surface of the fourth lens is a convex surface;
wherein a total effective focal length f of the projection lens assembly and an effective focal length f4 of the fourth lens satisfy: 1.5<f/f4<2.5.

13. The projection lens assembly according to claim 12, wherein the total effective focal length f of the projection lens assembly and an effective focal length f1 of the first lens satisfy: 2.0<f/f1<3.5.

14. The projection lens assembly according to claim 12, wherein the total effective focal length f of the projection lens assembly and an effective focal length f2 of the second lens satisfy: f/f2≤−4.0.

15. The projection lens assembly according to claim 12, wherein the third lens has a positive refractive power, and an effective focal length f3 of the third lens and the total effective focal length f of the projection lens assembly satisfy: 1.0<f3/f<5.5.

16. The projection lens assembly according to claim 12, wherein a light transmittance of the projection lens assembly is greater than 85% in a light wave range from 800 nm to 1000 nm.

17. The projection lens assembly according to claim 12, wherein a distance TTL on the optical axis from a source plane of the projection lens assembly to the image-side surface of the fourth lens and the total effective focal length f of the projection lens assembly satisfy: TTL/f<1.0.

18. The projection lens assembly according to claim 12, wherein a maximum effective semi-diameter DT42 of the image-side surface of the fourth lens and a maximum effective semi-diameter DT41 of a source-side surface of the fourth lens satisfy: 1.0<DT42/DT41<1.4.

19. The projection lens assembly according to claim 12, wherein a spacing distance T12 on the optical axis between the first lens and the second lens and a spacing distance T23 on the optical axis between the second lens and the third lens satisfy: 0.8<T12/T23<2.2.

20. The projection lens assembly according to claim 12, wherein a center thickness CT4 of the fourth lens on the optical axis and a center thickness CT2 of the second lens on the optical axis satisfy: 1.5<CT4/CT2<3.0,
 wherein a radius R8 of curvature of the image-side surface of the fourth lens and a radius R1 of curvature of a source-side surface of the first lens satisfy: −1.5≤R8/R1≤−1.0,
 wherein a radius R4 of curvature of the image-side surface of the second lens and a radius R3 of curvature of the source-side surface of the second lens satisfy: −2.4<R4/R3<−0.8.

* * * * *